(12) United States Patent
Naskar et al.

(10) Patent No.: US 11,279,805 B2
(45) Date of Patent: Mar. 22, 2022

(54) PLASTICIZED TEREPHTHALATE-BASED POLYESTER BLENDS CONTAINING FATTY ACIDS OR ESTERS THEREOF

(71) Applicants: UT-Battelle, LLC, Oak Ridge, TN (US); University of Tennessee Research Foundation, Knoxville, TN (US)

(72) Inventors: Amit K. Naskar, Knoxville, TN (US); Kokouvi Akato, Bear, DE (US); Ngoc A. Nguyen, Oak Ridge, TN (US); David P. Harper, Maryville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 16/519,396

(22) Filed: Jul. 23, 2019

(65) Prior Publication Data
US 2020/0032007 A1   Jan. 30, 2020

Related U.S. Application Data

(60) Provisional application No. 62/703,586, filed on Jul. 26, 2018.

(51) Int. Cl.
*C08J 3/18* (2006.01)
*C08K 5/09* (2006.01)
(Continued)

(52) U.S. Cl.
CPC ............. *C08J 3/18* (2013.01); *C08J 3/201* (2013.01); *C08K 5/09* (2013.01); *C08K 5/101* (2013.01);
(Continued)

(58) Field of Classification Search
CPC ........................................................ C08J 3/18
See application file for complete search history.

(56) References Cited

U.S. PATENT DOCUMENTS

| | | | | |
|---|---|---|---|---|
| 4,486,561 A | * | 12/1984 | Chung | .............. C08K 5/098 |
| | | | | 524/107 |
| 5,039,740 A | | 8/1991 | Anderson et al. | |
| | | (Continued) | | |

FOREIGN PATENT DOCUMENTS

| | | | | |
|---|---|---|---|---|
| GB | 968322 A | * | 9/1964 | ........... C09D 167/00 |
| GB | 1331788 A | * | 9/1973 | ............... E04F 15/10 |
| WO | WO-2017127224 A1 | * | 7/2017 | ........... C08G 63/668 |

OTHER PUBLICATIONS

Magee, T.V., et al., "Composition of American Distilled Tall Oils", JAOCS, Apr. 1992, pp. 321-324, vol. 69, No. 4.

*Primary Examiner* — Michael F Pepitone
(74) *Attorney, Agent, or Firm* — Scully, Scott, Murphy & Presser, P.C.

(57) ABSTRACT

A plasticized terephthalate-based polyester blend comprising a terephthalate-based polyester (e.g., polyethylene terephthalate, i.e., PET) homogeneously blended with a fatty acid or ester thereof, wherein said fatty acid or ester thereof is present in said polyester blend in an amount of 1-50 wt %. Also described herein is a method for producing a plasticized terephthalate-based polyester blend, the method comprising melt mixing a terephthalate-based polyester with a fatty acid or ester thereof at a temperature in a range of 230-250° C. to produce said polyester blend, wherein said fatty acid or ester thereof is present in said polyester blend in an amount of 1-50 wt % and is homogeneously blended with said terephthalate-based polyester.

27 Claims, 11 Drawing Sheets

(51) Int. Cl.
*C08L 97/00* (2006.01)
*C08J 3/20* (2006.01)
*C08K 5/101* (2006.01)

(52) U.S. Cl.
CPC ......... *C08L 97/005* (2013.01); *C08J 2367/02* (2013.01)

(56) References Cited

U.S. PATENT DOCUMENTS

| | | |
|---|---|---|
| 9,453,129 B2 | 9/2016 | Naskar |
| 9,815,985 B2 | 11/2017 | Naskar et al. |
| 2019/0062495 A1 | 2/2019 | Meng et al. |

\* cited by examiner 3A 
3B 
3C 
3D 4A  4B 4C  4D

7A

7B

7C

7D

8A

8B 9A 
9B 
9C 
9D

PLASTICIZED TEREPHTHALATE-BASED POLYESTER BLENDS CONTAINING FATTY ACIDS OR ESTERS THEREOF

CROSS REFERENCE TO RELATED APPLICATIONS

The present application claims benefit of U.S. Provisional Application No. 62/703,586, filed on Jul. 26, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates generally to polymer blend compositions, and more particularly, to polyester blend compositions in which a plasticizer is included.

BACKGROUND OF THE INVENTION

Polyethylene terephthalate (PET) is a semi-crystalline commodity thermoplastic polyester broadly used in the packaging and apparel industries. It is estimated that 389 billion individual PET bottles were produced globally in 2010, and the number is forecasted to grow over the next 5 years (Orset, C., et al., *Waste Management*, 2017. 61: p. 13-27). Production of beverage bottles comes at a price as generated waste must be dealt with continually. Post-industrial and post-consumer PET waste often goes to landfills and creates environmental hazards because of the lack of biodegradation of PET (Kint, D. et al., *Polymer International*, 1999. 48(5): p. 346-352).

To address the environmental issues and create potential new revenue streams for these wastes, there have been continuing efforts to recycle the waste into reusable materials for a variety of end uses, including in construction, packaging, and composite materials. The conventional process in the art of recycling PET is to melt the PET at or above its melting point of 260° C. and mold it into other objects. However, the relatively high melting temperature of PET requires a substantial energy input, which not only makes the recycling process costly but also risks degradation of the material. Thus, at least for the purpose of reducing cost, there would be an advantage in a process that could lower the melt processing temperature of PET. In addition to making the process more cost efficient, lowering the melt processing temperature of PET expands the possibilities of incorporating a host of plasticizers, processing aids, and other modifiers that could beneficially impact the physical properties of the PET but that would normally degrade at the melting point of PET.

SUMMARY OF THE INVENTION

In a first aspect, the present disclosure is directed to plasticized terephthalate-based polymer blends in which a fatty acid or ester is homogeneously incorporated. By virtue of the fatty acid or ester, the blends can advantageously be melt-mixed and extruded at temperatures substantially lower than conventionally practiced in the art. The blend more specifically includes a terephthalate-based polyester homogeneously blended with a fatty acid or ester thereof, wherein the fatty acid or ester thereof is present in the polyester blend in an amount of 1-50 wt %. In some embodiments, the blend further includes a phenol-containing polymer, such as lignin.

In another aspect, the present disclosure is directed to methods for producing such blends. As indicated above, the fatty acid or ester has herein been found to lower the melt processing temperature of the blend to temperatures below 260° C. More specifically, the method includes melt mixing a terephthalate-based polyester with a fatty acid or ester thereof at a temperature in a range of 230-250° C. to produce the polyester blend, wherein the fatty acid or ester thereof is present in the polyester blend in an amount of 1-50 wt % and is homogeneously blended with the terephthalate-based polyester. In some embodiments, lignin or other phenol-containing polymer is melt mixed with the polyester and fatty acid or ester to form a polyester blend containing at least these three components. The lignin or other phenol-containing polymer may be included in an amount of, for example, 1-50 wt % by weight of the polyester blend. Surprisingly, the presence of lignin in the fatty acid plasticized PET matrix further lowers the viscosity of the melt and enhances processability.

BRIEF DESCRIPTION OF THE FIGURES

(FIG. 3A) and 250° C. (FIG. 3B) and frequency-dependent storage modulus, G', at $T_{ref}$=240° C. (FIG. 3C) and 250° C. (FIG. 3D) of recycled PET and its tall oil fatty acid (TOFA) plasticized derivatives: PR10, PR20, and PR30.

Figure 8A:
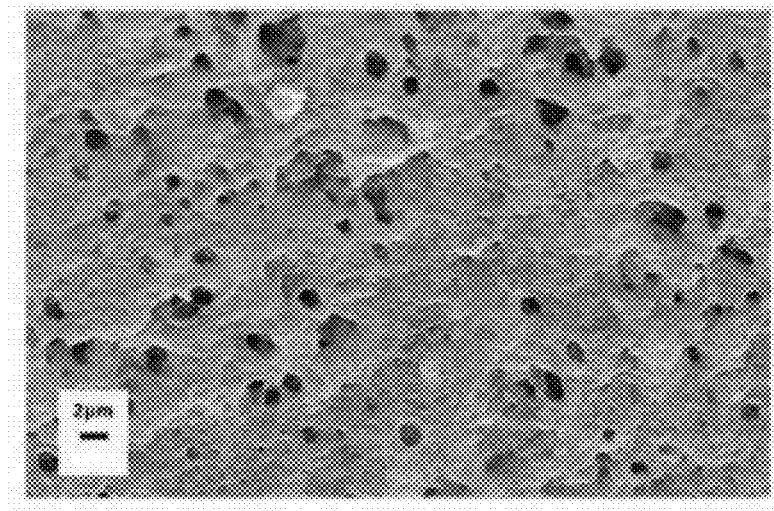
FIGS. 8A-8B. Scanning electron micrographs of cryofractured and NaOH etched surfaces of 10% fatty acid modified PET loaded with 30% lignin L blend [i.e., $PET_{PL}$/
Figure 8B:
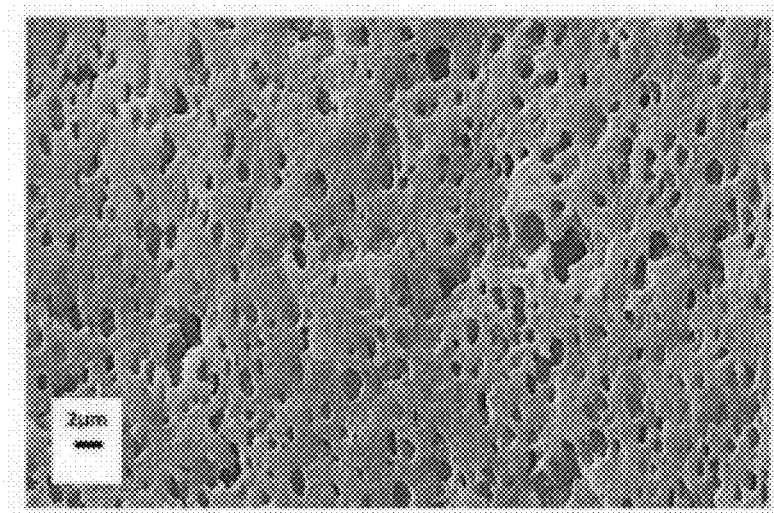

30L](FIG. 8A) and 10% fatty acid modified PET loaded with 30% heat-treated lignin $L_{HT}$ blend [i.e., $PET_{PL}/30L_{HT}$] (FIG. 8B).

Figure 9A:
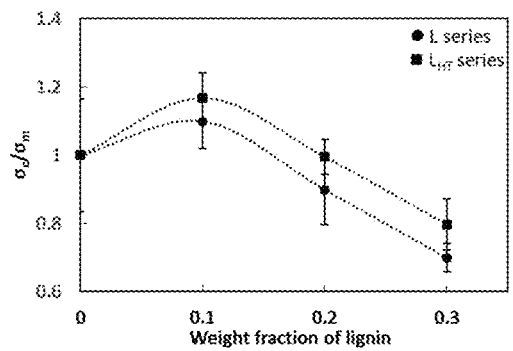
Figure 9B:
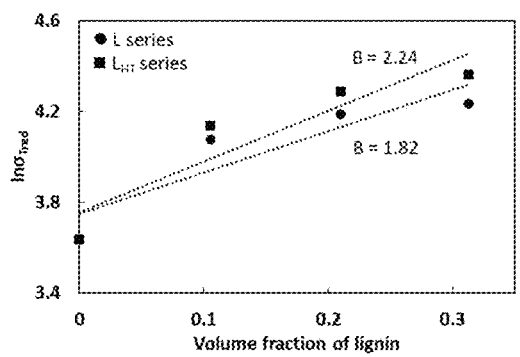
Figure 9C:
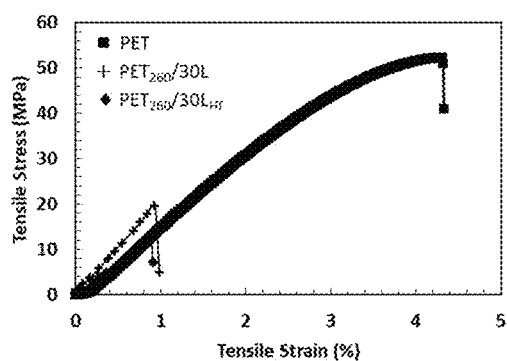
Figure 9D:
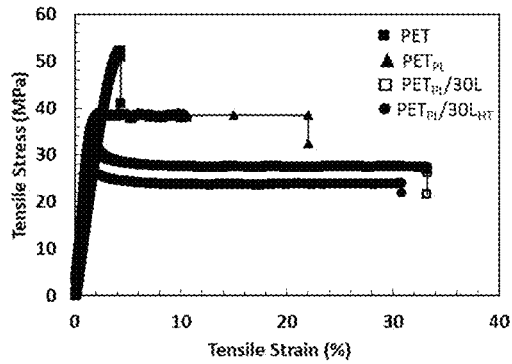

FIGS. 9A-9D. FIGS. 9A and 9B are plots of ratios of tensile strength of lignin-loaded (both L and $L_{HT}$ containing) compositions over those of fatty acid modified PET matrix at different lignin weight fractions (FIG. 9A), and the natural logarithm of reduced tensile strength as a function of volume fraction of lignin (FIG. 9B). FIG. 9C shows representative stress-strain profiles of neat (not-plasticized) PET matrix blended (and processed at 260° C.) with 30 wt % L and $L_{HT}$. FIG. 9D shows representative stress-strain profiles of: neat PET (processed at 260° C.), 10 wt % fatty acid modified PET matrix ($PET_{PL}$) and its blends (processed at 240° C.) with 30 wt. % L and $L_{HT}$ (blends denoted as $PET_{PL}/30L$ and $PET_{PL}/30L_{HT}$).

Figure 10:
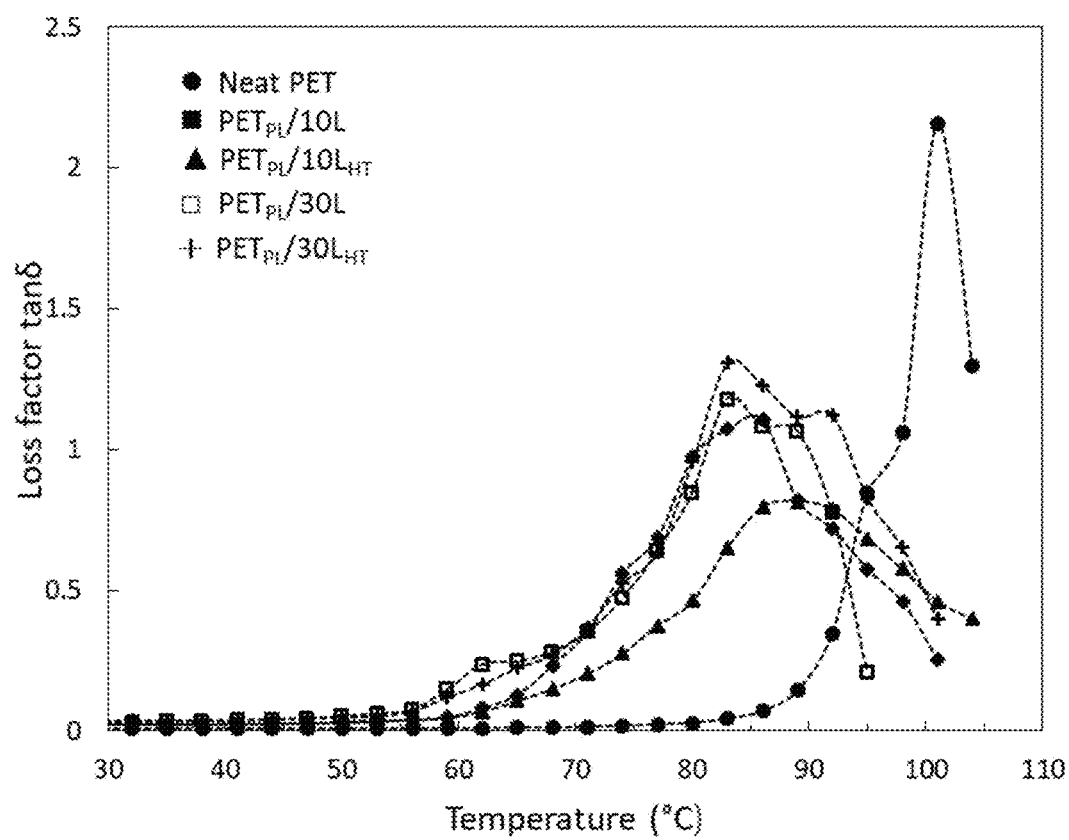

FIG. 10. Plot of loss tangent peak of neat PET, $PET_{PL}$ and its derivative blends with L and $L_{HT}$ in different compositions (10% and 30% loadings) at 10 Hz frequency.

FIGS. 11A-11D. Plots of frequency-dependent complex viscosity ($\eta^*$) at $T_{ref}$=240° C. (FIG. 11A) and 250° C. (FIG. 11B) and frequency-dependent storage modulus (G') at $T_{ref}$=240° C. (FIG. 11C) and 250° C. (FIG. 11D) of recycled PET, its plasticized resin ($PET_{PL}$), and its lignin-based blends ($PET_{PL}/30L$ and $PET_{PL}/30L_{HT}$).

DETAILED DESCRIPTION OF THE INVENTION

In a first aspect, the present disclosure is directed to a polymer blend material that includes (i) a terephthalate-based polyester homogeneously blended with (ii) a fatty acid or ester thereof. The term "blend" (or more particularly, "polymer blend"), as used herein, refers to a solid solution in which discrete microscopic regions of components (i) and/or (ii) are present. The polymer blend may exhibit substantial integration (i.e., near homogeneous) or complete integration at the microscale or approaching the molecular level, but without losing each component's identity. Generally, one of the components (i) or (ii) functions as a matrix in which domains (i.e., particles or microscopic regions) of the other component (i) or (ii) are dispersed. The domains are generally up to or less than 100 microns (100 μm) in size. In different embodiments, the domains are up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm. Any of the above exemplary domain sizes may alternatively represent a mean or median domain size, as found in a particle size distribution curve. For example, in some embodiments, at least 80%, 85%, 90/o, or 95% of the domains have a size up to or less than any exemplary values provided above. In some embodiments, substantially all (e.g., above 95%) or all (i.e., 100%) of the domains have a size up to or less than any exemplary values provided above.

The terephthalate-based polyester can be any polymer containing esterified terephthalic acid groups. The terephthalate-based polyester can be conveniently described by the following structural formula

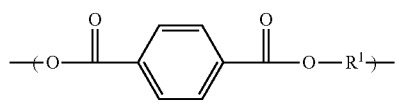
(1)

In Formula (1) above, $R^1$ is a hydrocarbon linker. The hydrocarbon linker typically contains at least 1, 2, or 3 and up to 4, 5, 6, 7, 8, 9, 10, 11, or 12 carbon atoms. In the case of $R^1$ being an alkylene linker, the polyester can be classified as a polyalkylene terephthalate. In the case where $R^1$ is methylene (—$CH_2$—), the polyester is a polymethylene terephthalate (PMT); in the case where $R^1$ is ethylene (—$CH_2CH_2$—), the polyester is a polyethylene terephthalate (PET); in the case where $R^1$ is propylene (—$CH_2CH_2CH_2$—), the polyester is a polypropylene terephthalate (PPT); in the case where $R^1$ is butylene (—$CH_2CH_2CH_2CH_2$—), the polyester is a polybutylene terephthalate (PBT). The variable n is typically a value of at least 5, 10, 15, 20, 50, 100, 200, 500, or 1000.

In one set of embodiments, the polyester is homogeneously blended with at least one fatty acid. For purposes of the invention, the fatty acid typically possesses at least eight carbon atoms. In different embodiments, the fatty acid may contain precisely or at least, for example, 8, 9, 10, 11, 12, 13, 14, 15, 16, 17, 18, 19, 20, 21, 22, or 24 carbon atoms, or a number of carbon atoms within a range bounded by any two of the foregoing values. Moreover, the fatty acid may be saturated or unsaturated. Unsaturated fatty acids may be mono-unsaturated (by containing one olefinic bond) or polyunsaturated (by containing two or more olefinic bonds), and may have a cis or trans configuration.

The fatty acid generally has the following structure:

(2)

In Formula (2), the variable m is typically at least 6. In different embodiments, m is precisely or at least, for example, 6, 7, 8, 9, 10, 11, 12, 13, 14, 15, 16, 17, 18, 19, 20, 21, or 22 or a number within a range bounded by any two of the foregoing values. The structure in Formula (2), without further modification, represents saturated fatty acids. However, in Formula (2), any two (or four, six, or other multiple of two) hydrogen atoms on adjacent carbon atoms may be removed with simultaneous formation of at one or more carbon-carbon double bonds between adjacent carbon atoms, to result in a mono-unsaturated or polyunsaturated fatty acid. Some examples of saturated fatty acids include caprylic acid (8 carbon atoms), capric acid (10 carbon atoms), lauric acid (12 carbon atoms), myristic acid (14 carbon atoms), palmitic acid (16 carbon atoms), stearic acid (18 carbon atoms), arachidic acid (20 carbon atoms), behenic acid (22 carbon atoms), and lignoceric acid (24 carbon atoms). Some examples of unsaturated fatty acids include myristoleic acid (14 carbon atoms), palmitoleic acid (16 carbon atoms), oleic acid (18 carbon atoms), linoleic acid (18 carbon atoms, polyunsaturated fatty acid), arachidonic acid (20 carbon atoms), and erucic acid (22 carbon atoms, polyunsaturated fatty acid). In some embodiments, a combination (e.g., two, three or more) of fatty acids is homogeneously blended with the polyester. For example, tall oil fatty acid (TOFA) may be blended with the polyester, wherein TOFA typically contains a mixture of oleic, palmitic, and/or linoleic acids, among other components.

In another set of embodiments, the polyester is homogeneously blended with at least one fatty acid ester, which are commonly known as oils or fats. The fatty acid ester can be derived by esterification between a monohydric alcohol or polyhydric alcohol (polyol) and any one or more fatty acids described above, such as any one or more of the specific fatty acids provided above. The monohydric or polyhydric alcohol may have any number of carbon atoms, such as 1-20 carbon atoms, and may be saturated or unsaturated. The polyhydric alcohol may have, for example, two, three four, five, or six hydroxy groups. Some examples of monohydric alcohols include methanol, ethanol, n-propanol, isopropanol, n-butanol, sec-butanol, isobutanol, n-pentanol, isopentanol, n-hexanol, n-heptanol, n-octanol, n-nonanol, n-decanol, n-dodecanol, and ethanolamine. Some examples of polyhydric alcohols include ethylene glycol, propylene glycol, diethylene glycol, diethanolamine, diisopropanolamine, glycerol, trimethylolpropane, 3-methylpentane-1,2,5-triol, pentaerythritol, phloroglucinol, sorbitol, and inositol. Moreover, in the case of polyhydric alcohols, all of the hydroxy groups may or may not be esterified. For example, in the case of the polyhydric alcohol being glycerol, the fatty acid ester may be a monoglyceride, diglyceride, or triglyceride.

As the fatty acid ester may contain one, two, three, or more fatty acids esterified with a monohydric or polyhydric alcohol, along with carbon atoms contributed by the alcohol, the fatty acid ester will contain a higher number of carbon atoms than the unesterified fatty acid, including a multiplicity of the number of carbon atoms present in the fatty acid portions along with number of carbon atoms present in the alcohol. For example, in the case of the fatty acid ester being soybean oil, the soybean oil contains a glycerol core esterified with three fatty acids (i.e., is a triglyceride), wherein the three fatty acids typically include at least one of, for example, alpha-linolenic acid, linoleic acid, oleic acid, stearic acid, and palmitic acid. Other oils herein considered as fatty acid esters include, for example, olive, coconut, corn, grape seed, hemp, peanut, safflower, sunflower, canola, sesame, avocado, palm, flaxseed, linseed, cottonseed, castor, rapeseed, cocoa butter, and rice bran oil. In specific embodiments, the fatty acids are the derivatives of animal fats. In some embodiments, the polyester is homogeneously blended with one or more fatty acids and one or more fatty acid esters, such as found in tall oil fatty acid. In other embodiments, any one or more of the above classes or specific types of fatty acids or fatty acid esters are excluded from the polyester blend.

The fatty acid or ester thereof is typically present in the polyester blend in an amount of at least 1 wt % (by weight of the polyester blend). In different embodiments, the fatty acid or ester thereof is included in the polyester blend in an amount of precisely, about, or at least, for example, 1, 2, 5, 10, 15, 20, 25, 30, 35, 40, 45, or 50 wt %, or an amount within a range bounded by any two of the foregoing values (e.g., 1-50 wt %, 2-50 wt %, 3-50 wt %, 4-50 wt %, 5-50 wt %, 1-40 wt %, 2-40 wt %, 3-40 wt %, 4-40 wt %, 5-40 wt %, 1-30 wt %, 2-30 wt %, 3-30 wt %, 4-30 wt %, 5-30 wt %, 1-25 wt %, 2-25 wt %, 3-25 wt %, 4-25 wt %, 5-25 wt %, 1-20 wt %, 2-20 wt %, 3-20 wt %, 4-20 wt %, or 5-20 wt %).

In some embodiments, the polyester blend further includes lignin as another component (i.e., in addition to the polyester and fatty acid or ester), wherein the lignin is homogeneously blended in the polyester blend. The lignin can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins are very rich aromatic compounds containing many hydroxyl (also possible carboxylic) functional groups attached differently in both aliphatic and phenolic groups. Additionally, lignins possess highly-branched structures. These characteristics of lignins determine their corresponding physical properties. The molar mass or molecular weight ($M_w$) of the lignin is generally broadly distributed, e.g., from approximately 1000 Dalton (D) to over 10,000 D. In typical embodiments, the lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100,000, 500,000 or 1,000,000 g/mol, or a weight within a range bounded by any two of the foregoing values, such as 500-10,000 g/mol or 500-5,000 g/mol [G. Fredheim, et al., *J. Chromatogr. A*, 2002, 942, 191; and A. Tolbert, et al., *Biofuels, Bioproducts & Biorefining* 8(6) 836-856 (2014)] wherein the term "about" generally indicates no more than ±10%, ±5%, or ±1% from an indicated value. In some embodiments, the lignin is significantly deploymerized when isolated from native biomass source and has a molar mass of less than 1000 D. Their natural branches and low $M_w$ result in very brittle characteristics. The aromatic structures and rich functional groups of lignins also lead to varied rigid and thermal properties. Lignins are amorphous polymers, which results in very broad glass transition temperatures ($T_g$), from ca. 80° C. to over 200° C. The glass transition temperatures are critical temperatures at which the lignin macromolecular segments become mobile. Some lignins exhibit a very good flow property (low molten viscosity), whereas others display several orders of magnitude higher viscosity.

Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The lignin can have any of a wide variety of relative weight percents (wt %) of H, G, and S components. As observed in some seeds, lignin may also consist of caffeyl alcohol units, e.g., Chen et al. *PNAS*, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % f each alcohol component is 100%, or at least 98% if other minor components are considered. Different wood and plant sources (e.g., hardwood (HW), such as oak, maple, poplar, and the like; softwood (SW), such as pine, spruce, and the like; or grass-derived lignins, such as switchgrass, corn, bamboo, perennial grass, orchard grass, alfalfa, wheat, miscanthus, bamboo, and bagasse) often widely differ in their lignin compositions, and are all considered herein as sources of lignin. In some embodiments, depending on the desired characteristics of the lignin-PEG copolymer, any one or more types of lignin, as described above, may be excluded from the polyester blend.

Besides the natural variation of lignins, there can be further compositional variation based on the manner in which the source lignin has been processed. For example, the source lignin can be a Kraft lignin, sulfite lignin (i.e., lignosulfonate), or a sulfur-free lignin. As known in the art, a Kraft lignin refers to lignin that results from the Kraft process. In the Kraft process, a combination of aqueous sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin.

There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. The solvent system in organosolv delignification of biomass often include organic alcohols, such as methanol, ethanol, propanol, butanol, and isobutyl alcohol; aromatic alcohols, such as phenol and benzyl alcohol; glycols, such as ethylene glycol, triethylene glycol, propylene glycol, butylene glycol and other higher glycols; ketones, such as acetone, methyl ethyl ketone and methyl isobutyl ketone; organic acids, such as formic acid, acetic acid and propionic acid, amines, esters, diethyl ether, dioxane, glycerol, or mixture of these solvents. Typically, some degree of dilute acid pretreatment of biomass helps the delignification process. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the polyester blend.

The lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology,* 25(7), pp. 759-761 (2007) and A. M. Anterola, et al., *Phytochemistry,* 61, pp. 221-294 (2002)). The engineering of lignin is particularly directed to altering the ratio of G and S components of lignin (D. Guo, et al., *The Plant Cell,* 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America,* 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology,* 137, pp. 663-674 (2007)). These residues contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

The lignin may, in some embodiments, be a crosslinked lignin that is melt-processible or amenable to melt-processing. The term "crosslinked" can mean, for example, that the lignin contains methylene (i.e., —$CH_2$—) and/or ethylene (i.e., —$CH_2CH_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In some embodiments, the lignin is not crosslinked. In particular embodiments, the lignin component exhibits a suitable steady shear viscosity to render it as a malleable film-forming material at the processing temperature and shear rate employed. Typically, at a melt processing condition, the steady shear viscosity (at 1-100 $s^{-1}$ shear rate regime) of the lignin component is at least or above 100 Pa·s, 500 Pa·s, 1000 Pa·s, 3000 Pa·s, or 5000 Pa·s, or within a range therein. In some embodiments, the lignin may be oxidized (e.g., by exposure to chemical oxidizing agent), while in other embodiments, the lignin is not oxidized. In some embodiments, the lignin is chemically unmodified relative to its natural extracted or isolated form. In some embodiments, the lignin is chemically modified by acetylation, oxypropylation, hydroxymethylation, epoxidation, or the like, as known in the art. In some embodiments, the lignin is plasticized with solvents or plasticizers to induce melt-processability. Solvents and plasticizers include, for example, dimethylsulfoxide, dimethylacetamide, polyoxyalkylene, and glycerol, as known in the art. In some embodiments, the use of a solvent or plasticizer is excluded.

The glass transition temperature ($T_g$) of the crosslinked lignin is generally above room temperature (typically, 15, 20, 25, or 30° C.). In different embodiments, the lignin (either isolated lignin from biomass or its crosslinked derivative) has a glass transition temperature of precisely, about, at least, or greater than 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., 240° C., or 250° C., or a $T_g$ within a range bounded by any two of the foregoing values. In some embodiments, the lignin does not exhibit a detectable $T_g$, unless mixed with a plasticizing component such as solvent, or polymeric additives. The polymer blend material in which the lignin is incorporated may also possess any of the glass transition temperatures or ranges thereof provided above.

The lignin (in either raw form isolated from biomass or its crosslinked derivative) may be substantially soluble in a polar organic solvent or aqueous alkaline solution. As used herein, the term "substantially soluble" generally indicates that at least 1, 2, 5, 10, 20, 30, 40, 50, or 60 grams of the lignin completely dissolves in 1 deciliter (100 mL) of the polar organic solvent or aqueous alkaline solution. In other embodiments, the solubility is expressed as a wt % f the lignin in solution. In some embodiments, the lignin has sufficient solubility to produce at least a 5 wt %, 10 wt %, 15 wt %, 20 wt %, 30 wt %, 40 wt %, or 50 wt % solution in the polar organic solvent or aqueous alkaline solution. The polar organic solvent can be aprotic or protic. Some examples of polar aprotic solvents include the organoethers (e.g., diethyl ether, tetrahydrofuran, and dioxane), nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1.1,-trichloroethane), ketones (e.g., acetone, 2-butanone), and dialkylcarbonates (e.g., ethylene carbonate, dimethylcarbonate, diethylcarbonate). Some examples of polar organic protic solvents include the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine). The aqueous alkaline solution can be any aqueous-containing solution having a pH of at least (or over) 8, 9, 10, 11, 12, or 13. The alkalizing solute can be, for example, an alkali hydroxide (e.g., NaOH or KOH), ammonia, or ammonium hydroxide. Combinations of any of these solvents may also be used. In some embodiments, the lignin is dissolved in a solvent, such as any of the solvents described above, when used to form the polyester blend. The solvent may or may not be incorporated into the final polyester blend. In some embodiments, one or more classes or specific types of solvents (or all solvents) are excluded from the lignin or polyester blend.

The lignin is typically present in the polyester blend in an amount of at least 1 wt % (by weight of the polyester blend). In different embodiments, the lignin is included in the polyester blend in an amount of precisely, about, or at least, for example, 1, 2, 5, 10, 15, 20, 25, 30, 35, 40, 45, or 50 wt %, or an amount within a range bounded by any two of the foregoing values (e.g., 1-50 wt %, 2-50 wt %, 3-50 wt %, 4-50 wt %, 5-50 wt %, 1-40 wt %, 2-40 wt %, 3-40 wt %, 4-40 wt %, 5-40 wt %, 1-30 wt %, 2-30 wt %, 3-30 wt %, 4-30 wt %, 5-30 wt %, 1-25 wt %, 2-25 wt %, 3-25 wt %, 4-25 wt %, 5-25 wt %, 1-20 wt %, 2-20 wt %, 3-20 wt %, 4-20 wt %, or 5-20 wt %).

The polyester blend material typically possesses a tensile yield stress (or "yield stress" or "tensile yield strength") of at least or above 10 MPa. In different embodiments, the tensile yield stress is at least or above 10 MPa, 15 MPa, 20 MPa, 25 MPa, 30 MPa, 35 MPa, 40 MPa, 50 MPa, 60 MPa, 70 MPa, 80 MPa, 90 MPa, 100 MPa, or 150 MPa, or a yield stress within a range bounded by any two of the foregoing exemplary values. As understood in the art, the term "tensile yield strength" or "yield stress" refers to the stress maxima in the stress-strain curve experienced by the polymer during tensile deformation just after the linear elastic region; polymers deformed beyond the yield stress usually show permanent deformation. Beyond the "tensile yield stress" point in the stress-strain profile of the polymer, the stress experienced by the polymer during stretching may remain less than that of the yield stress. Thus, "tensile strength" that is defined at the stress experienced by polymer at fracture or failure point can be lower than the yield strength. In some polymers, the tensile stress experienced at failure is significantly higher than that of the yield stress. In such cases, the stress-strain curve shows a rise (sometimes steep rise) in stress with increase in strain due to enhanced molecular orientation along the direction of deformation. Such a phenomenon of increase in the stress at large strain values (as the polymer molecules orient) is known as "strain hardening". For some of the exemplary yield stress values provided above, the tensile strength (i.e., the tensile stress experienced at failure) of the polyester blend will be higher according to the known difference in how yield stress and tensile strength are defined.

The polyester blend material typically possesses an ultimate elongation of at least 1%. In different embodiments, the polyester blend material may exhibit an ultimate elongation of about 1, 2, 3, 4, 5, 6, 7, 8, 9, 10, 20, 30, 40, 50, 60, 70, 80, 90 or 100%, or an ultimate elongation within a range bounded by any two of the foregoing exemplary values. In some embodiments, the polymer blend material possesses any of the foregoing elongation characteristics along with any of the foregoing yield stress or tensile strength characteristics, also provided above. In some embodiments, the polymer blend material exhibits less than 1% ultimate elongation. The polyester blend material typically possesses a tensile modulus of at least 1, 2, 3, 4, 5, 10, 12, 15, 18, 20, 22, 25, or 30 GPa, or a tensile modulus within a range bounded by any two of the foregoing values.

In another aspect, the present disclosure is directed to methods for producing the polyester blend material described above. In the method, at least (or only) the polyester and fatty acid or fatty acid ester components, and optionally, a lignin component, are mixed and homogeneously blended to form the polymer blend material. Any one of the components can be included in liquid form (if applicable), in solution form, or in particulate or granular form. In the case of particles, the particles may be, independently, for example, microparticles (e.g., at least 1, 2, 5, or 10 μm, and up to 20, 50, 100, 200, or 500 μm), or macroparticles (e.g., above 500 μm, or at least or up to 1, 2, 5, 25, 50, 100, 500, or 1000 mm).

As discussed above, the fatty acid or ester has herein been surprisingly found to lower the melt processing temperature of the polyester blend to temperatures below 260° C. More specifically, the method includes melt mixing a terephthalate-based polyester, as described above, with a fatty acid or ester thereof at a temperature below 260° C., such as a temperature in a range of 230-250° C. to produce the polyester blend, wherein the fatty acid or ester thereof is present in the polyester blend in an amount of 10-50 wt % and is homogeneously blended with the terephthalate-based polyester. In some embodiments, lignin or other phenol-containing polymer (e.g., a tannin, polyvinylphenol, novolak, or resole) is melt mixed with the polyester and fatty acid or ester to form a polyester blend containing at least these three components. The lignin or other phenol-containing polymer may be included in an amount of, for example, 1-50 wt % by weight of the polyester blend, as discussed above. In some embodiments, the terephthalate-based polyester and/or lignin (or other solid ingredient) is thermally treated under at least partial vacuum (i.e., below atmospheric pressure) at a temperature within a range of 100-250° C., 100-200° C., 100-150° C., 150-250° C., or 150-200° C. for at least 1, 2, 3, or 4 hours before being melt-mixed to produce the polyester blend. The reduced atmosphere treatment is particularly useful for removing moisture from the starting materials in order to avoid hydrolytic degradation of the polyester during melt processing.

By being "homogeneously blended" is meant that, in macro (e.g., millimeter) scale, no discernible regions of at least the polyester or fatty acid (or ester thereof) exist in the polyester blend. In embodiments where a lignin or other phenol-containing polymer is present, the polyester blend may include no discernible regions of at least the polyester, fatty acid (or ester thereof), and lignin or other phenol-containing polymer. If further components are included, the further components may also be melt mixed and homogeneously present in the resulting polyester blend. In other words, the homogeneous blend may possess a modified or compatibilized phase structure (not necessarily a single phase structure, but often with retained but shifted $T_g$ associated with individual phases) for at least the polyester and fatty acid (and optionally, lignin or other phenol-containing polymer) components. The modified-phase structure generally indicates near homogeneous integration at microscale or near the molecular level without losing each component's identity. In the case of an additional non-homogeneous component, the instantly described polymer blend, including polyester, fatty acid, and/or phenolic components, can be viewed as a "homogeneous matrix" in which the additional non-homogeneous component is incorporated. Preferably, all of the components retain their identity and components are well dispersed in the nanometer scale.

In the melt mixing process, the shear rate (which is related to the mixing speed in rpm) is preferably at least or above 1 s$^{-1}$ and up to or less than 1000 s$^{-1}$. In some embodiments, the shear rate is about, for example, 1, 5, 10, 20, 30, 40, 50, 100, 150, 200, 250, 300, 350, 400, 500, 600, 700, 800, 900, or 1000 s$^{-1}$, or a shear rate within a range bounded by any two of the foregoing values. The mixing rate (in rpm) corresponding to the foregoing shear rate range is approximately 1-150 revolutions of the extruding screw (or blades) per minute. With respect to processing time, (or residence time of material inside the mixer during continuous processing) the blending process preferably employs a processing time (time during blending at a particular temperature and shear rate) of at least or above 1, 5, or 10 minutes and up to or less than 45 minutes, such as a processing time of about, for example, 10, 15, 20, 25, 30, 35, 40, or 45 minutes, or a processing time within a range bounded by any two of the foregoing values.

The polyester blend material is typically subjected to a shape-forming process to produce a desired shape of the polymer blend. The shape-forming process can include, for example, extrusion molding (e.g., pour, injection, or compression molding), melt pressing, or stamping, all of which are well known in the art. In other embodiments, the polymer blend material is used in a printing process to form a shape containing the polymer blend material, wherein the printing process can be, for example, a rapid prototyping (RP) process known in the art, such as a fused deposition modeling (FDM) or fused filament fabrication (FFF) process known in the art, which may also be collectively considered as 3D printing processes.

In still other aspects, the invention is directed to an article containing the polyester blend described above. The article may be one in which some degree of toughness and/or mechanical strength is present. The blend may or may not be further reinforced with, for example, continuous or particulate carbon particles, ceramic (e.g., metal oxide) particles, or metallic particles to produce composite parts, wherein the term "particles" may include fibers. In some embodiments, the "particles" may include fibers, granules, or fibrils of organic materials, such as natural fibers, whiskers, cellulose, fibers, plastic fibers, cellulose nanocrystals, or nanofibers. The article may be used as or included in any useful component, such as a structural support, the interior or exterior of an automobile, furniture, a tool or utensil, or a sheet or plate. In some embodiments, the polyester blend may be produced and applied as a coating or film, such as a protective film. The polyester blend may be rendered as a coating or film by, for example, melting the blend or dissolving the components of the blend in a suitable solvent, followed by application of the liquid onto a suitable substrate and then solvent removal.

Examples have been set forth below for the purpose of illustration and to describe certain specific embodiments of the invention. However, the scope of this invention is not to be in any way limited by the examples set forth herein.

Example 1

Materials

Thermoplastic polyester PET was received from Eastman Chemicals USA. It is scrap from the resin manufacturing facility and supplied as white powder. Melt flow rate (MFR) measured was 55 g/10 min (2.16 Kg at 280° C.). The PET was dried under vacuum at 130° C. for 8 hours to avoid hydrolytic degradation during melt processing. The tall oil fatty acid (TOFA) was acquired from Westvaco Chemicals, Charleston S.C. It is Westvaco L-5 Tall oil fatty acid (CAS #61790-12-3). The specifications of the TOFA were reported as: Acid number (min 190), rosin acids (max 5%) and color or Gardner (max 7).

Blending of Post-Industrial Polyester and TOFA

Dried polyester PET and TOFA were melt mixed at 240° C. in a Haake MiniLab co-rotating twin-screw extruder. TOFA was added in 3 different wt. % (10, 20 and 30). The extruder has one zone heated with screws length of 110 mm. The blends were processed at a screw rotation speed of 30 rpm. The extrudates were collected for further analysis.

Blends Characterization

The three different extrudates were named PR10, PR20 and PR30, respectively, in accordance with the wt. % of TOFA added (10, 20 and 30). A differential scanning calorimeter (DSC) was used to determine the thermal characteristics of the as-received PET and the plasticized PET samples. Samples with mass of approximately 3-4 mg each were loaded in hermetic pans for measurements. A cycle of heating-cooling-heating from −50° C. to 300° C. at 10° C./min and an isothermal of 2 minutes after first heating were used. The degree of crystallization was computed from Equation 1 (below). The melting enthalpy ($\Delta H_m$) was obtained from the second heating curve. $W_f$ is the PET weight fraction in each composition and $\Delta H_{100}$ is the theoretical fusion enthalpy of 100% crystalline PET (140 J/g).

$$\chi_c = \frac{\Delta H_m}{W_f \times \Delta H_{100}} \times 100\% \tag{1}$$

The same setup of DSC was used but at different ramping rates (2, 5, 10, 20, and 30° C./min) to study the crystallization rate of as-received PET and plasticized PET resins. Dynamic mechanical thermal analysis of the blends was performed using a TA Q800 (TA Instruments) in tension mode. Monofilaments of diameters varying from 0.20 to 0.45 mm generated from each sample were used for testing. The measurements were conducted in the temperature range of 30° C. to 150° C. and at frequencies of 1 Hz and 0.01% strain. The heating rate was 3° C./min. Cryogenically fractured surfaces of extrudates were evaluated by scanning electron microscopy (SEM). The samples were also analyzed by solid state Fourier transform infrared spectroscopy. A total of 32 scans were obtained in Attenuated Total Reflectance mode. Average spectra with 4 cm⁻¹ resolution were obtained for all samples. The theological properties were evaluated using the Discovery Hybrid rheometer. All measurements were carried out at 3% strain, which is in the linear region as determined by a strain sweep in an inert atmosphere of nitrogen. Frequency sweeps from 100 to 1 rad/s at different temperatures were performed.

Fiber Melt-Spinning and Characterization

The twin screw extruder with appropriate die attachment was also used to generate continuous single fibers from all three plasticized PETs with TOFA. A spinneret with 200 μm diameter hole was attached for fiber forming as the extrudate is forced through the orifice. A 76 mm rotating drum was used to collect continuous single fibers. Single fibers were isolated for mechanical testing. They were glued onto a paper tab using an adhesive. The tabs were mounted into a set of pneumatic grips, and the sides were cut at mid-gauge before load application. The gauge length was 25.4 mm. The tabs permit consistent and proper mounting of fiber specimens. Mechanical testing at a crosshead speed of 15 mm/minw as used. The mean of 13 specimens is reported. The fibers were also characterized by differential scanning calorimetry (DSC) based on sample preparation and experimental conditions described above. SEM micrographs of the fiber lateral surface were also obtained.

received PET except PR10. It is apparent that addition of TOFA favors segmental molecular mobility of PET which affects the crystallization kinetics and crystallinity. Although the presence of TOFA increases PET crystallinity, it is obvious that the modified PET crystals are low-melting and imperfect.

Figure 1A:
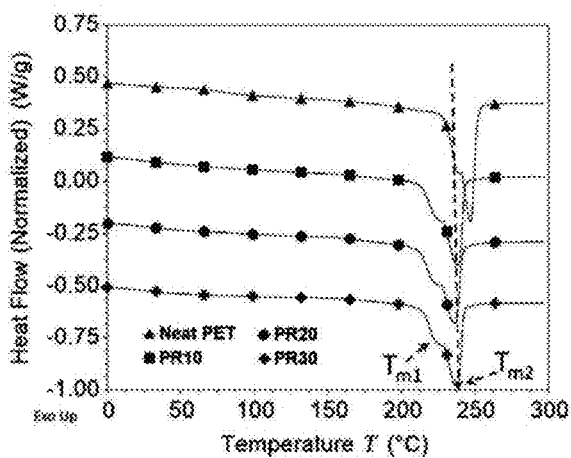
FIGS. 1A-1D. Thermal characterization of as-received recycled PET (neat PET) and its derivatives containing 10, 20, and 30 wt. % fatty acid compositions referred to as plasticized resins PR10, PR20, and PR30, respectively: DSC second heating thermograms (FIG. 1A), DSC cooling thermograms (FIG. 1B), DMA storage modulus E' (FIG. 1C), and DMA loss factor, Tan δ (FIG. 1D).
Figure 1B:
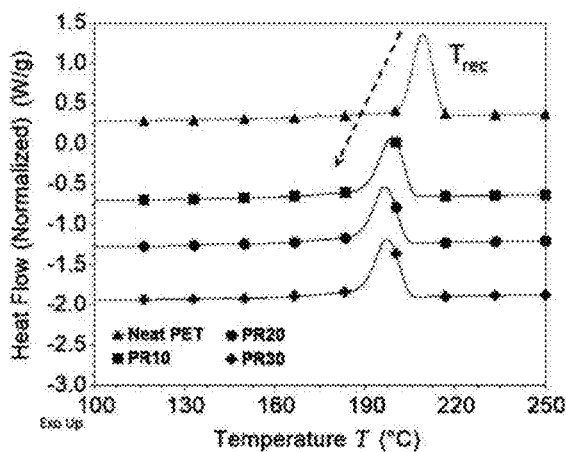
Figure 1C:
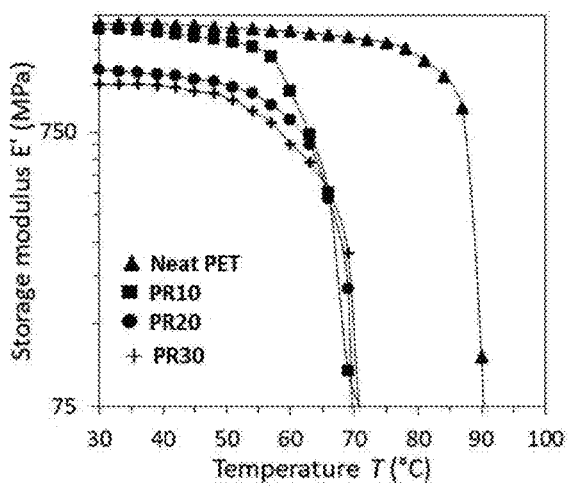
Figure 1D:
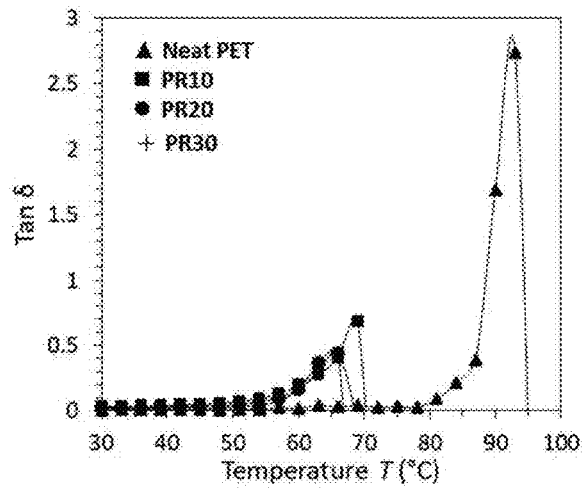

The storage modulus E', related to the material stiffness, decreased with addition of plasticizer. Changes in the phase structure due to incorporation of TOFA cause the storage modulus to decrease (FIG. 1C). The sharp drop of E' for all samples as the temperature increases signals that glass transition events are occurring in the amorphous phase. Like most polymers, PET undergoes thermophysical transitions around its glass transition temperature $T_g$. $T_g$ is known as the temperature at which binding forces between polymer chains are relaxed to initiate large-scale molecular movements. $T_g$ is considered an essential parameter as it helps to define the state of polymers at their service temperatures. Here, the $T_g$, as reported in Table 1, is the maximum peak of the loss factor Tan δ (FIG. 1D). The as-received PET has a $T_g$ of 91° C. As desired, addition of the renewable plasticizer decreases $T_g$. TOFA addition depresses PET's $T_g$ by up to 25° C. at 30 wt. % addition, which is evidence of pronounced plasticization. TOFA presence permits the PET matrix to become less dense and facilitate motion of the PET molecular segments to start at lower temperature.

TABLE 1

Thermal and crystalline properties of neat PET and its plasticized derivatives

| Samples | $T_{m1}$ (° C.)$^a$ | $T_{m2}$ (° C.)$^a$ | $\Delta H_m$ (J/g)$^a$ | $T_{rec}$ (° C.) | $\Delta H_{rec}$ (J/g) | $\chi_c$ (%)$^a$ | $(T_g)$(° C.)$^b$ |
|---|---|---|---|---|---|---|---|
| Neat PET | 237.3 | 247.9 | 48.6 | 209.1 | 55.8 | 34.7 | 91 |
| PR10 | 222.8 | 238.3 | 42.8 | 198.9 | 52.1 | 33.9 | 69 |
| PR20 | 220.2 | 236.8 | 41.9 | 196.4 | 54.5 | 37.4 | 67 |
| PR30 | 222.6 | 238.1 | 40.3 | 197.1 | 64.9 | 41.1 | 66 |

$^a$Values obtained from second heating curve of DSC
$^b T_g$ reported from Tan δ peak Thermal Characteristics Polymeric materials are macromolecules with intramolecular cohesive forces among them. When heat is applied, the macromolecules become soft and flexible and easy to process. Low-molecular weight plasticizers are often added to increase the flexibility at room temperature and to improve processing. Evidence of the plasticizing effect of TOFA is shown in FIG. 1A. The DSC thermograms indicate that, as the amount of TOFA renewable plasticizer increases, the PET melting peak shifts toward lower temperature. Neat PET is a heterogeneous polyester with both amorphous and crystalline domains. Its thermogram shows a large endotherm with a peak temperature at ~248° C. corresponding to melting of crystals. The peak shifts to lower temperature as more and more plasticizer is added. The low-molecular weight renewable plasticizer TOFA inserts its molecules between the crystalline domains of the PET allowing for softening and increased flexibility. The depression of melting temperatures $T_{m1}$ and $T_{m2}$ reduces the processing temperature of PET. In parallel, incorporation of TOFA shifts the recrystallization $T_{rec}$ to lower temperatures (FIG. 1B) because of the TOFA-induced PET chain flexibility that alters crystallization kinetics discussed in detail later.

Figure 2A:
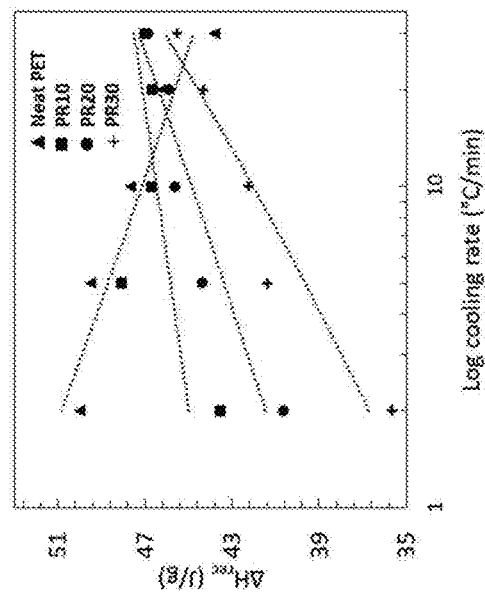
FIGS. 2A and 2B. Crystallization peak temperatures, $T_{rec}$, (FIG. 2A), and crystallization enthalpy, $\Delta H_{rec}$, as a function of log cooling rate (FIG. 2B).
Figure 2B:
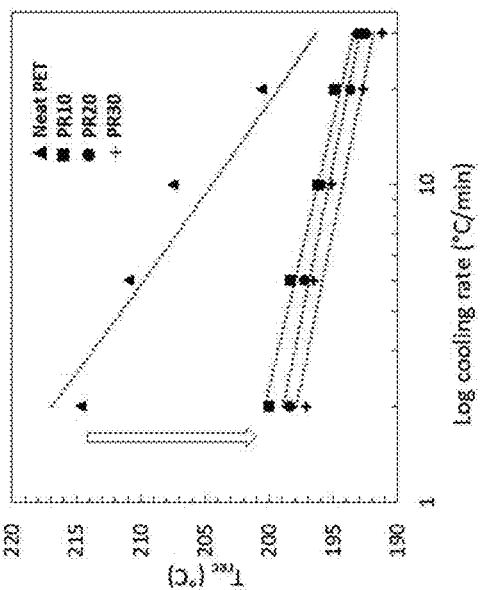

The change in crystallization behavior was evaluated and reported in Table 1 using the thermodynamic melting enthalpy from the DSC thermograms in Equation 1. The neat PET $\Delta H_m$ is 48.6 J/g, which is lower than 100% crystalline PET (140 J/g), thus a degree of crystallinity of 34.7%. The $X_C$ of TOFA plasticized PET are all higher than the as- Crystallization Behavior The recrystallization temperatures ($T_1$) and enthalpy (H) of neat PET decrease as the cooling rate increases (FIGS. 2A and 2B). Plasticization is observed as the PET crystallizes faster than the plasticized PET resins at lower cooling rates, but the difference in $T_{rec}$ is minimal at 30° C./min rate. $T_{rec}$ is critical in polymer processing, especially for a semi-crystalline polymer like PET. It is measured as the solidification temperature. The fact that the neat PET and the TOFA-plasticized PET display $T_{rec}$ values close to each other at high cooling rates suggests that the crystallization mechanism is not much affected by the addition of TOFA. This is beneficial for a process like extrusion where high cooling rates are desired. $\Delta H_{rec}$ of plasticized resins diminish as the TOFA amount increases, except at higher TOFA content (FIG. 2B). Nevertheless, it increases as the cooling rate increases which is indifferent to the neat PET. Crystallization temperatures shift to lower temperatures with the addition of TOFA renewable plasticizer. Such reduction can be explained by two interconnected facts. First, TOFA addition depresses $T_g$ and increases chain mobility, and second, TOFA addition decreases PET's melting point, which also retards crystal growth. Furthermore, the slopes of the $T_{rec}$ vs. log cooling rate curves suggest that the excess TOFA reduces the crystallization rate because a steeper slope (neat PET) means faster crystallization compared to gentle slope (30 wt. % for example).

Flow Characteristics

Figure 3A:
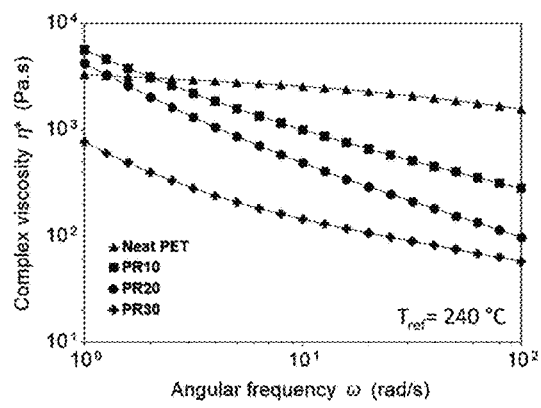
FIGS. 3A-3D. Frequency-dependent complex viscosity, η*, at $T_{ref}$=240° C.
Figure 3B:
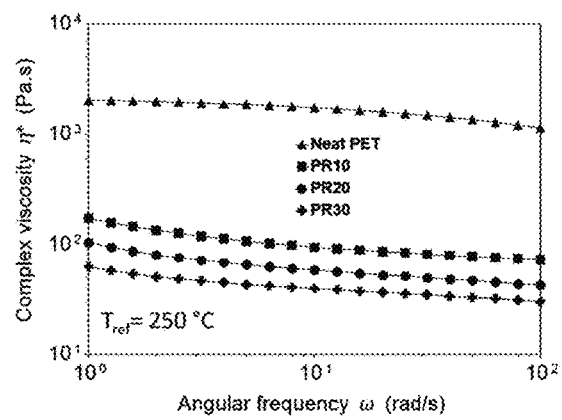
Figure 3C:
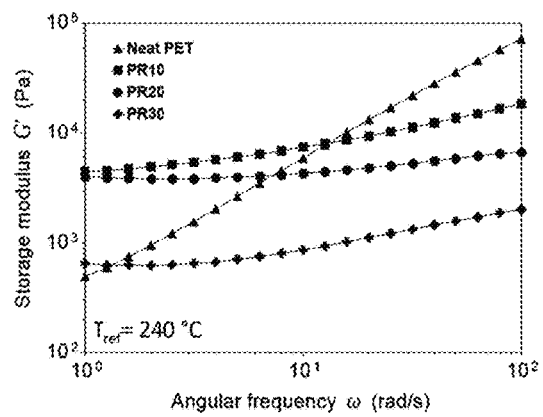
Figure 3D:
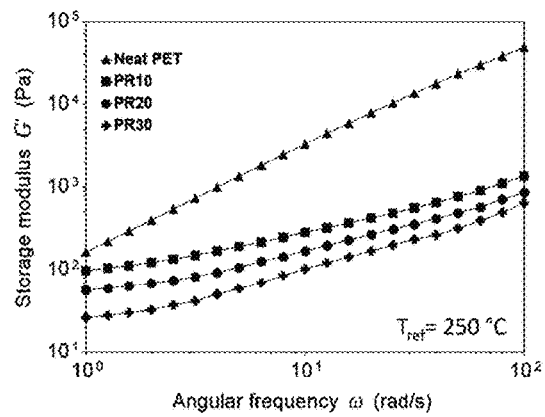

Oscillatory frequency sweeps were used to evaluate the flow characteristics of as-received PET and TOFA plasticized PET resins (FIGS. 3A-3D). The angular frequency ($\omega$) dependence of the complex viscosity ($\eta^*$) and the storage modulus (G') in the linear region have a more developed sensitivity to structural variation than the power-law region. At 240° C. (FIG. 3A), the neat PET shows a Newtonian behavior at very low frequency followed by normal shear thinning behavior where the complex viscosity starts to decrease with increasing angular frequency. The viscosity is high and decreases progressively because the data are collected in the linear region and the temperature is below the melting temperature recorded by DSC (248° C.). It is believed that chain disentanglement and mobility is limited due to lack of energy to disrupt them. The plasticized PET resins, however, show a similar decrease of viscosity with increasing frequency, but the slopes of the flow curves are sharper. Also, PR10 and PR20 show high viscosity at low frequency compared to neat PET. The effect of the plasticizer is evident for all three plasticized PET resins at 250° C. (FIG. 3B). The plasticization effect becomes more pronounced as the viscosity decreases with increasing plasticizer amount and the slopes of all the curves are steadier. The flow behavior shows that changes are occurring in the molecular structure of plasticized PET due to the addition of TOFA as a softening agent. The TOFA can interact with the PET amorphous segment and end groups through hydrogen bonding and can eventually undergo covalent esterification reaction with hydroxyl end groups leading to changes in the structure of modified PET. Such interaction is typical for excellent plasticizers as they decrease viscosity and hence improve the processing properties of PET. The master curves at $T_{ref}$=240° C. in FIG. 3C shows that the storage modulus G' is increasing with increasing co. A sharp increase in G' is observed in neat PET, but for all three plasticized PET resins, the rise is progressive. Also, all three plasticized resins have higher G' values at low frequency and G' for PR10 and PR20 continues to be higher than that of neat PET at below 10 rad/s. The master curves at $T_{ref}$=250° C. in FIG. 3D shows that neat PET has the highest G' over the whole frequency range, which indicates the highest rigidity. The slopes are different, but all storage moduli increase with increasing angular frequency. The TOFA modified resins' G' values decrease with increasing plasticizer loading amounts over the entire frequency range. This suggests that the plasticizer is lubricating the PET chains, and the plasticization effect is not only favoring change in morphology and increased chain mobility but also strongly affects the moduli of the modified resins. This is a strong indication of improved processing characteristics of the modified PET.

Morphological Evaluation

Figure 4A:
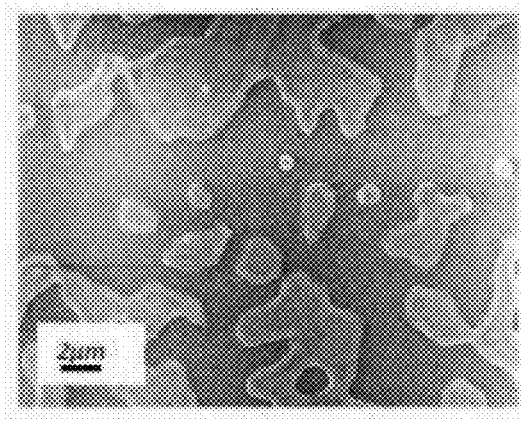
FIGS. 4A-4D. Micrographs of cryofractured surfaces: neat PET (FIG. 4A), PET/10% TOFA (FIG. 4B), PET/20% TOFA (FIG. 4C), and PET/30% TOFA (FIG. 4D).
Figure 4B:
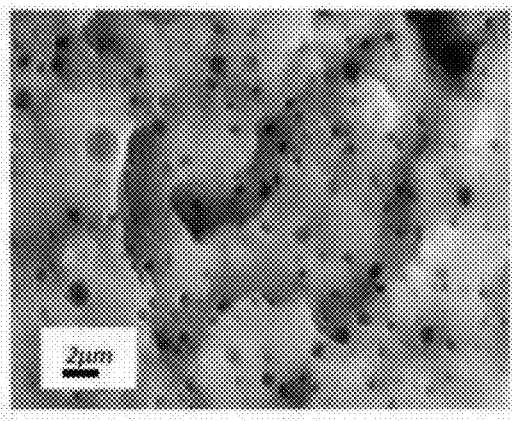
Figure 4C:
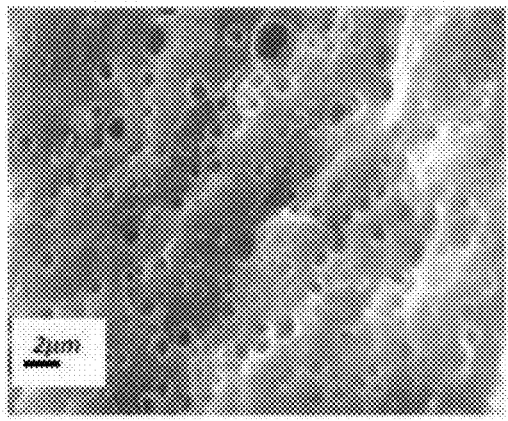
Figure 4D:
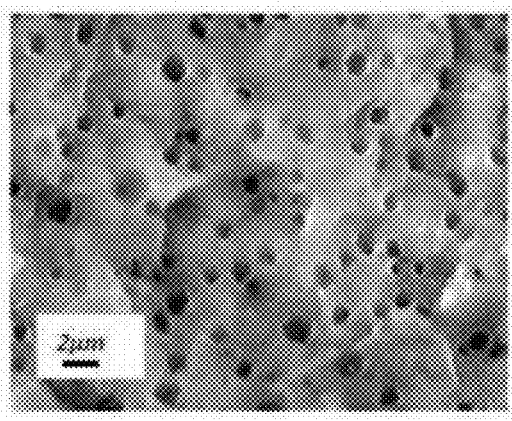

Representative SEM micrographs of cryo-fractured surfaces of the as-received waste polyester and the TOFA plasticized matrices are represented in FIGS. 4A-4D. The as-received PET surface shows a relatively smooth fracture surface with residual morphology left by the fracture path (FIG. 4A). The plasticized PET samples, however, exhibit completely different topography of the fractured surface. The surfaces have cavities created by the addition of TOFA that are very well statistically dispersed and around 0.2 to 1 µm in size (FIGS. 4B, 4C, and 4D). For the 30 wt. % plasticized resin, the cavities are larger in size due to coalescence of the extra amount of TOFA during melt mixing, which creates substantial agglomeration. The observations clearly show that the TOFA is acting as a lubricant by inserting itself in the polyester matrix and favoring chain motion and slippage of molecular constituents. This in turn introduces the thermophysical changes detected by thermal and dynamic mechanical analysis (FIG. 1). FTIR spectra show that minimal changes in the chemical structure were observed in the PET blended with TOFA. The increase in the (—C—H) stretching around 2800-2900 $cm^{-1}$ is roughly proportional to the content of the renewable softening agent.

Properties of Fibers Spun from Plasticized Polyester Resins

The TOFA plasticized matrices were melt-spun to produce continuous filaments using the bench top extruder previously used for blending. The extruder and attached spinneret temperatures were set to 240° C. and 245° C., respectively, for all samples, which is well below the neat PET working temperatures (~270-285° C.). The 30 wt % plasticized matrix spun the best out of all formulations. This can be explained by the pronounced effect the plasticizer has on lowering the viscosity at the spinning temperatures as shown in flow characterization (FIGS. 3A-3D). Fibers from all matrices were collected continuously on a spool. The winding speed needed to be adjusted based on the material viscosity. For instance, 30 wt. % plasticized PET was collected at 130 meter/min compared to 10 wt. % plasticized matrix at 74 meter/min. These parameters will affect the mechanical performance of the fibers.

Thermal analysis by DSC shows interesting thermal behavior of the fibers. The first heating thermogram of all the TOFA modified PET fibers indicated early relaxation around 50° C. The relaxation was followed by a cold crystallization around 100° C. and melting behavior at 240° C. The melt-spinning process can induce meta-order structure because of the high degree of chain alignment and show multiple crystallization peaks in the first heating cycle of the fibers.

The single fibers were isolated for tensile testing. The results are reported in Table 2 below. All fiber groups showed adequate tensile performances (tensile strength of 29-38 MPa, Tensile modulus 2.7-2.8 GPa and elongation at break of 20-36%).

TABLE 2

Mechanical properties of the plasticized fibers[1]

| Composition (wt. %) | | Properties | | | |
| --- | --- | --- | --- | --- | --- |
| PET | Fatty acid | Fiber diameter (micrometer) | Tensile strength (MPa) | Modulus (GPa) | Elongation (%) |
| 90 | 10 | 36 (3.5) | 38 (6.3) | 2.7 (0.4) | 20 (4) |
| 80 | 20 | 46 (9.1) | 29 (2.9) | 2.8 (0.6) | 36 (6) |
| 70 | 30 | 42 (5.3) | 32 (3.4) | 2.7 (0.5) | 32 (12) |

[1]Standard deviations are shown in parenthesis

Figures 5A, 5B, 5C:
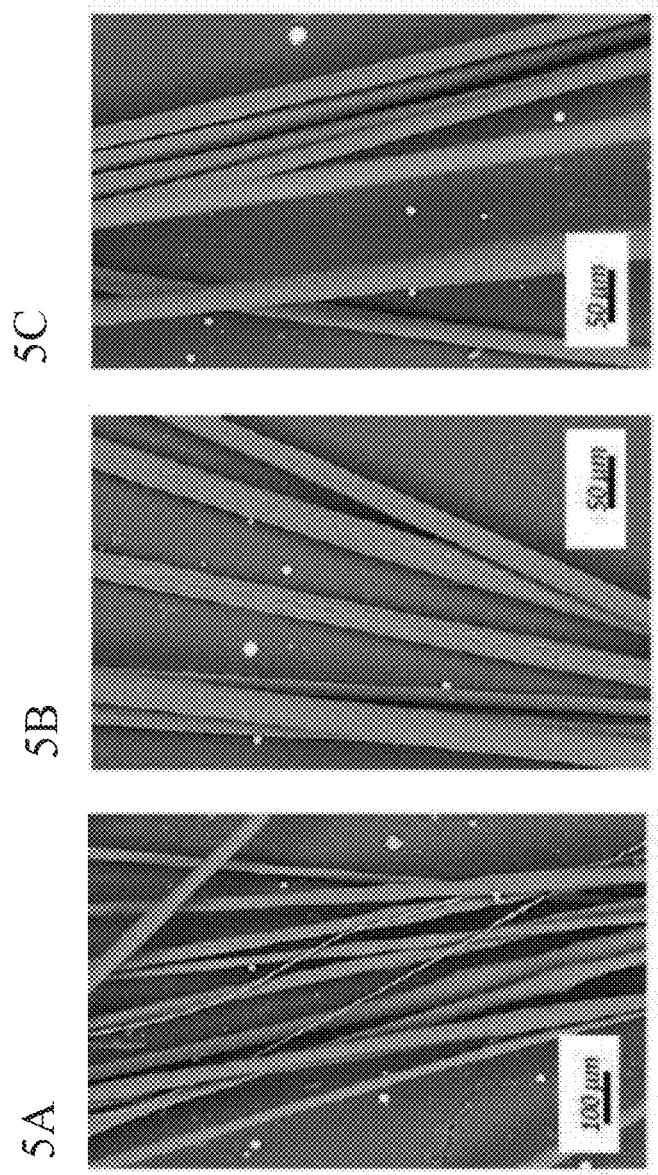
FIGS. 5A-5C. SEM micrographs of fibers from (i) recycled PET/10 wt. % TOFA (FIG. 5A), (ii) recycled PET/20 wt. % TOFA (FIG. 5B), and (iii) recycled PET/30 wt. % TOFA (FIG. 5C).

It is important to note that a limitation of in the set-up and the viscosity difference between the matrices made it impossible to produce the fibers using the same processing conditions, which affected the tensile properties of the fiber generated. For example, an attempt was made to collect the filaments at a higher speed as possible, which is critical to alignment of the polymer chains in the fibers and influences the strength of the fibers. However, PR30, which was collected at higher speed, did not have the highest tensile strength. Defects created by a large amount of TOFA could be the reason for the weaker fiber tensile strength. Also, PR30 did not have the smallest fiber diameter. This suggests that a lower recrystallization temperature is affecting the 30 wt. % plasticized matrix overall fiber diameter. The performance of fibers displayed herein (Table 2) could be improved if annealed at a temperature slightly lower than the crystallization temperature under tension, before mechanical testing. Morphological evaluation of the fiber using SEM (FIGS. 5A-5C) shows the longitudinal surfaces of the fibers. It is evident that the 10 wt. % TOFA-plasticized PET has a small fiber diameter and very fine fibers were observed. The fibers' surfaces were not smooth and uniform as desired, which could be caused by the die capillary or temperature set-up.

Example 2

In these experiments, melt-based blending techniques were used to develop sustainable polymer blends of post-manufacturing PET waste and an organosolv lignin, a low-priced natural polymer obtained from biomass. In general, normal processing temperatures (265° C. to 280° C.) of post-manufacturing PET are deemed detrimental for nanoscale dispersion of lignin without thermal degradation of the lignin phase. For this reason, lignin can be thermally treated to remove low molecular weight volatile materials and improve its heat resistance during blending. It also helps to avoid devolatilization that negatively impacts the blend morphology (by creating porosity) and properties. Based on the lesson learned from EXAMPLE 1, a renewable plasticizer-tall oil fatty acid (TOFA) that is essentially oleic acid enriched oil—at 10 wt. % relative to PET was added to help soften PET chains and to reduce its melt-processing temperatures by 20° C. TOFA is another co-product (apart from lignin) of the paper industry and is used here in combination with the recycled PET for the preparation of lignin-based thermoplastic alloys that are malleable and reprocessable. The process does not need any solvent or toxic chemicals to make products. The process via melt-phase extrusion does not generate significant waste. Thus, it fulfills many of the basic principles of green chemistry. Combining thermal treatment with plasticizing permits appropriate choices in mixing temperature, to control dispersion of lignin and the associated promotion of interfacial interaction that are necessary to create higher performance sustainable composites of lignin. In summary, this example involves adept characterization of lignin, its structural transformation during thermal treatment followed by an assessment of interfacial interactions of lignin in the PET matrix, and subsequent correlation to morphology and mechanical properties of sustainable PET/lignin blends.

Materials

Thermoplastic polyester PET had the properties described in Example 1. The PET was dried under vacuum at 130° C. for 12 hours to avoid hydrolytic degradation during melt processing. Organosolv hardwood lignin (L) was used. The lignin melts fully at 147° C. and flows at 163° C. The lignin was dried at 60° C. for 8 hours. The tall oil fatty acid (TOFA) was acquired from Westvaco Chemicals, Charleston S.C. It is a Westvaco L-5 Tall oil fatty acid. The specifications of the TOFA were reported as: acid number (min 190), rosin acids (max 5%) and color or Gardner (max 7).

Lignin Thermal Treatment and Characterization

The lignin (L) was thermally treated in a vacuum oven at 200° C. for 60 minutes to improve its thermal stability. The thermally treated lignin is identified as $L_{HT}$. Both as-received L and $L_{HT}$ were characterized using gel permeation chromatography (GPC) to evaluate molecular weight and molecular weight distribution. Functional features were characterized and quantified by $^{31}P$ NMR and 2D $^{1}H$-$^{13}C$ HSQC NMR spectroscopy using known preparation and analysis methods. Thermogravimetric analysis was used to study thermal stability of the lignin in a nitrogen atmosphere from 100° C. to 800° C. at 10° C./min after a short drying step at 100° C. for 20 minutes.

Blend Preparation

Blends of recycled PET and lignin at 10, 20 and 30 wt. % lignin loading of both as-received lignin (L) and thermally treated lignin ($L_{HT}$) were prepared respectively, with 10 wt. % of renewable plasticizer relative to the PET weight at 240° C. A Haake MiniLab co-rotating twin extruder (Thermo Scientific) with screw length of 110 mm was used at screw rotation speed of 30 rpm. In a different setup, the extruder was fitted with a die to generate monofilament of 0.20 to 0.40 mm diameter. The partially renewable blends are identified as $PET_{PL}/10L$, where 10 wt. % L was added and $PET_{PL}/30L_{HT}$, where 30 wt. % $L_{HT}$ was added respectively. All neat PET filaments used in this study were generated at 280° C. and used as reference. The PET with 10 wt. % of renewable plasticizer relative to the PET weight (denoted as $PET_{PL}$) was however, processed at 240° C. as control matrix material for the lignin containing blends.

Thermal Analysis

A differential scanning calorimeter (DSC) was used to determine the thermal transitions of the control PET and its lignin-derived blends. Samples with mass of approximately 3-4 mg each were loaded in hermetic pans for measurements. A cycle of heating-cooling-heating from −50° C. to 230° C. at 10° C./min and an isothermal of 2 minutes after first heating were used. Thermal decomposition of the blends was evaluated using a thermogravimetric analyzer under an oxidative atmosphere from 100° C. to 600° C. at 20° C./min after a short drying step.

Scanning Electron Microscopy and Morphology Analysis

A SEM microscope was used to obtain micrographs of the cryo-fractured surfaces of the blends. The samples were kept in 1M NaOH solution for 20 min at 80° C. after cryo-fracture before SEM analysis to remove lignin phases from the surface. Washed and dried samples were coated with gold to avoid charging when images were collected. Images were collected at an operating voltage of 20 KV.

Tensile and Dynamic Mechanical Testing

Monofilaments of control PET and its lignin-derived blends were tested using a pneumatic side action grip. The crosshead speed was set to 15 mm/min and the filaments cross-sectional diameters were used for calculation of cross-sectional area and applied stress. Dynamic mechanical analysis (DMA) measurements were carried out on the monofilaments (diameter 0.20-0.40 mm depending on the sample) at 0.1% strain rate, discrete frequencies of 1, 10, and 100 Hz, and between 30° C. and 150° C. temperature window scanned at 3° C./min.

Rheological Evaluation

The rheological properties were analyzed using a rheometer (DHR-3, TA instruments). All measurements were carried out in the linear regions at 3% strain in nitrogen atmosphere. Frequency sweeps from 100 to 1 rad/s at 240° C. and 250° C. were performed.

Results and Discussion

Lignin Structural Transformation

Lignin has gained valuable importance recently in the preparation of a new class of renewable thermoplastic elastomeric materials. Lignin is an excellent renewable feedstock for manufacturing of environment-friendly materials because of its multifunctional nature and associated chemistries. In this experiment, lignin was thermally treated at 200° C. under vacuum for 60 minutes to avoid thermal decomposition during blending with recycled PET. Detailed insight into the microstructural transformation induced by thermal treatment is important for the final properties of the manufactured blends. $^{31}$P NMR and 2D HSQC NMR were used to identify and quantify the chemical group profiles of both the as-received and thermally treated lignins.

Figure 6:
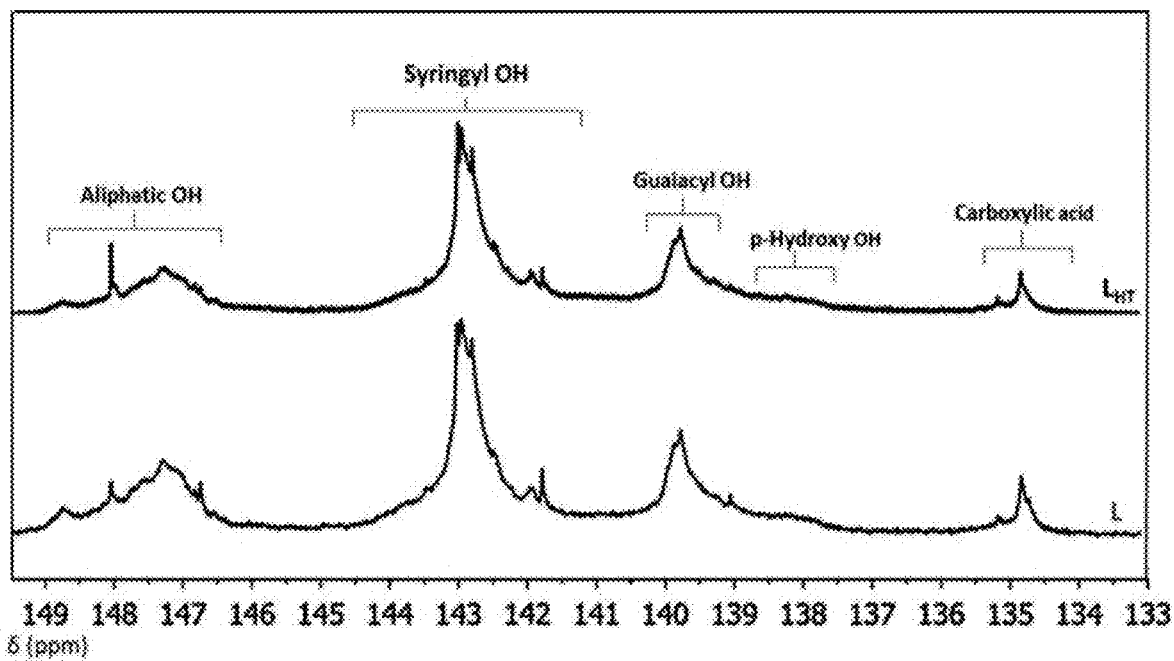
FIG. 6. Representations of functional groups and corresponding peaks identified in quantitative $^{31}$P NMR measurements after phosphorylation of an organosolv hardwood lignin (L) and the heat-treated composition of lignin L denoted as $L_{HT}$.
Figure 7A:
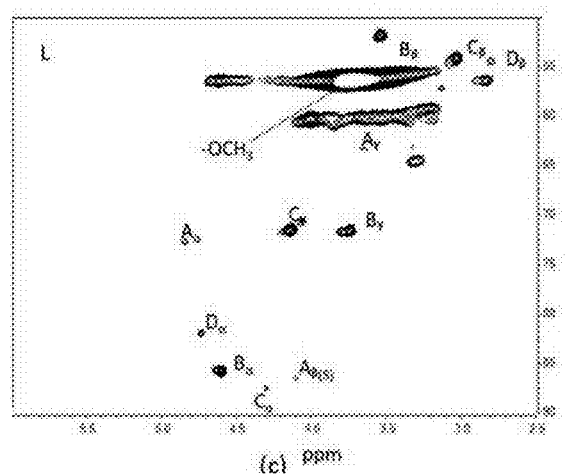
FIGS. 7A-7D. Two-dimensional 2D NMR heteronuclear single quantum coherence (HSQC) spectra of both L and $L_{HT}$ lignins. The top two images (FIGS. 7A and 7B) are the aliphatic oxygenated side chain region (SC/5H 50-90/2.5-6) for L and $L_{HT}$, respectively, and the bottom two images (FIGS. 7C and 7D) represent the aromatic/unsaturated region ($\delta_C/\delta_H$90-150/5-8) for L and $L_{HT}$, respectively.
Figure 7B:
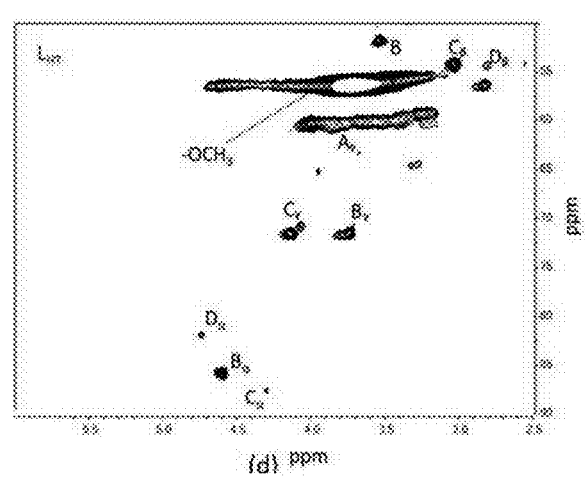
Figure 7C:
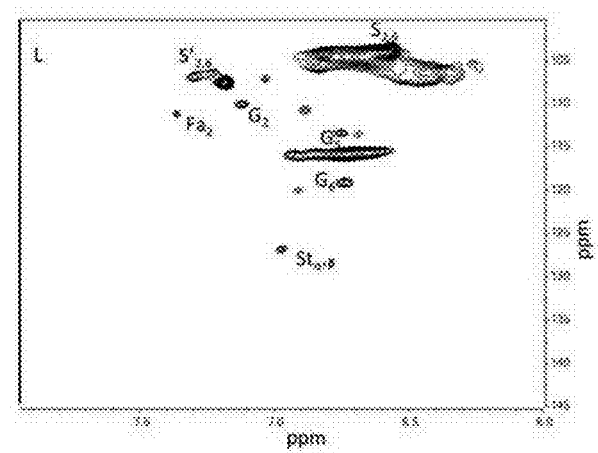
Figure 7D:
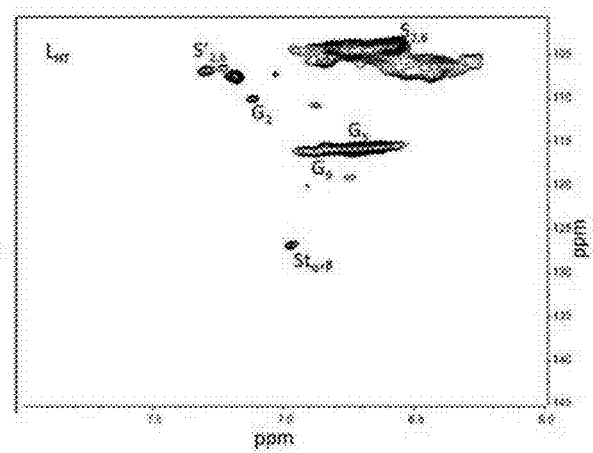

Phosphitylation of OH groups in lignin allows quantification of different OH moieties of lignin by $^{31}$P NMR analysis. The $^{31}$P NMR spectra with chemical shifts and microstructural assignments are shown in FIG. 6, whereas the amount of OH groups determined from the spectra is summarized in Table 3 below. Thermal treatment decreased the aliphatic OH content of lignin. L has the higher amount of aliphatic hydroxyl (2.01 mmol/g) compared to $L_{HT}$ (1.63 mmol/g). This indicates that during thermal treatment, structural transformation of lignin starts with dehydration which eliminates the side chain OH groups. The total amount of phenolic OH increased after thermal treatment; however, the carboxylic group content remained more or less the same. L is an organosolv-extracted hardwood lignin and is known to have phenolic syringyl (S—OH) and guaiacyl (G-OH) with little to no p-hydroxyphenyl (H—OH). The results are in accordance as these two groups are higher than the H—OH groups. However, thermal treatment introduced an increase of G-OH, and H—OH group for $L_{HT}$, which signifies possible cleavage of β-O-4 linkage associated with S- and G-lignin.

tions. The possibility of condensation reactions occurring among the lignin free radicals generated during thermal treatment may explain the increase of S—OH, G-OH, and H—OH groups in $L_{HT}$.

Molecular mass and its distribution for both lignins obtained by GPC indicate significant influence of thermal treatment at 200° C. on structural transformation of lignin. GPC results show an increase in $M_n$, $M_w$ and $M_w/M_n$ after thermal treatment. L was found to have $M_n$=890 g/mol, $M_w$=1486 g/mol, and $M_w/M_n$=1.67, while $L_{HT}$ had $M_b$=1103 g/mol, $M_w$=1924 g/mol, and $M_w/M_n$=1.75. The increased of average molecular weight is the result of condensation reactions that occurred during thermal treatment. Evidence of the reactions are found in features of the products as detected by $_{31}$P NMR and 2D HSQC NMR. Thermal behavior analysis by DSC agrees with these findings as glass transition temperature of lignin increased from 86° C. to 97° C. after thermal treatment. The degree of crosslinking was mild, otherwise a pronounced crosslinking would have enlarged the macromolecules to higher range. For example, $L_{HT}$ would have had higher molecular weight and viscosity. The fact that $L_{HT}$ still flows at ~165° C. is evidence of mild crosslinking. This also suggests that lignin oxidation was avoided in vacuum. A treatment duration of 60 minutes should have been enough to advance the condensation

TABLE 3

Functional groups of the L lignin and thermally treated lignin ($L_{HT}$) as determined by the quantitative $^{31}$P NMR method (mmol/g).

| Samples | Aliphatic OH | Syringyl OH | | Guaiacyl OH | | p-Hydroxyphenyl OH | Total phenolic OH | Carboxylic group |
|---|---|---|---|---|---|---|---|---|
| | | $C^a$ | $NC^b$ | $C^a$ | $NC^b$ | | | |
| L | 2.01 | 0.39 | 2.46 | 0.80 | 1.79 | 0.42 | 5.86 | 0.45 |
| $L_{HT}$ | 1.63 | 0.35 | 2.73 | 0.96 | 2.04 | 0.56 | 6.64 | 0.46 |

$^a$Condensed.
$^b$Non-condensed

Two regions of the 2D HSQC NMR spectra analyzed are shown in FIGS. 7A-7D. The top two images (FIGS. 7A and 7B) are the aliphatic oxygenated side chain region ($\delta C/\delta H$ 50-90/2.5-6) for L and $L_{HT}$, respectively, and the bottom two images (FIGS. 7C and 7D) represent the aromatic/unsaturated region ($\delta_C/\delta_H$ 90-150/5-8) for L and $L_{HT}$, respectively. Cross peak assignments and corresponding inter-unit linkages were also determined. The regions possess similarities between the two treatments (L or $L_{HT}$) except for a few signals. The cross peaks corresponding to Cα-Hα in β-O-4' substructures ($\delta_C/\delta_H$=71.9/4.9) and $C_\beta$—$H_\beta$ in β-O-4 substructures linked to syringyl units ($\delta_C/\delta_H$=86.3/4.15) were significantly reduced or disappeared after thermal treatment. The $C_5$—$H_5$ and $C_6$—$H_6$ in guaiacyl units were also reduced. This indicates that β-O-4' and β-O-4 aryl ether bonds cleaved during the thermal treatment and confirms the $^{31}$P NMR results discussed above. β-O-4 linkages are easily altered by heat as discussed in previous reports [Y. Zhang, J.-Q. Wu, H. Li, T.-Q. Yuan, Y.-Y. Wang and R.-C. Sun, *ACS Sustainable Chemistry & Engineering*, 2017, 5, 7269-7277]. The expectation is that ether radicals and phenoxyl radicals will result from these cleavages and react among themselves to initiate crosslinking reactions (condensation) or remain available for further interactions during melt blending of lignin with the engineered polyester. Moreover, phenolic OH groups in lignin are free radical scavengers too that are susceptible to these radicals for further condensation reactions if treatment was conducted in oxidative atmosphere [J. F. Kadla, S. Kubo, R. A. Venditti, R. D. Gilbert, A. L. Compere and W. Griffith, *Carbon*, 2002, 40, 2913-2920].

Thermal treatment improved thermal stability of the lignin by removal of volatiles, dehydration, and crosslinking in aromatic structures and their degree of condensation. The as-received lignin started to degrade at 185° C. and the treatment helped to shift the degradation temperature to higher temperatures to accommodate melt mixing with PET at 240° C. TGA thermograms of L and $L_{HT}$ were also determined. Weight reduction temperature recorded at 5% weight loss was 247° C. for L compared to 265° C. for $L_{HT}$. The derivative weight thermogram of as-received lignin has a shoulder from 143° C. to 258° C. that disappeared after thermal by removing low molecular weight volatiles and cleaving thermally liable ether bonds. Overall, thermal treatment under vacuum only changed lignin structure slightly to improve its thermal stability. This avoids significant oxidative degradation reactions that could have been detrimental to keeping the lignin malleable. In addition, the soak time of 60 minutes was good enough to generate lignin that is thermally stable and malleable for amalgamation in engineered polymer matrices.

Thermal and Morphological Properties of the Compositions

Thermal transition temperatures, calorimetric values, and degree of crystallinity computed from cooling and second heating of DSC thermograms were also determined. The results suggest that addition of TOFA plasticizer reduces the melting temperature of the neat PET. For example, the melting temperature of PET shifted from 247° C. to 239° C. in presence of 10 wt. % TOFA. Plasticizers are small molecular weight materials that are added to help soften the rigid amorphous phase of polymer. Plasticizers enhance segmental mobility by depressing the glass transition temperature ($T_g$) of the amorphous phase of the host polymers. The effect of the plasticizer on recrystallization during cooling was observed as the recrystallization temperature shifts from 208° C. to 202° C.

Addition of lignins (L and $L_{HT}$) in all compositions further reduces the melting temperatures and decreases the heat of fusion. It is due to the reduction in crystallite sizes in PET with incorporation of lignin in the blends. Also, the difference between the behavior of L series blends compared to $L_{HT}$ series blends indicates variance in the degree of interactions between the lignins and PET. In theory, the addition of oligomeric lignin increases the free volume in the PET matrix which led to the plasticization effect. Additionally, lignin addition shifts the recrystallization temperature ($T_{rec}$) of PET to lower temperatures. Shifting of $T_{rec}$ and $\Delta H_{rec}$ suggests that lignin is decelerating the recrystallization and crystal growth during cooling. Conclusions from these results show that interactions exist between both lignins and PET. These interactions could be the hydrogen bonding and n electron interactions. The degree of crystallinity (k) was computed using Equation 1 above and first heating curve calorimetric values. The presence of plasticizer lowers the crystallinity in PET matrix and the presence of lignin further lowers the degree of crystallinity. The lignin loaded (10-30 wt %) $PET_{PL}$ matrix exhibits 17-26% crystallinity.

Microscopic analysis of cryo-fractured surfaces of the blends (FIGS. 8A and 8B) shows that the morphologies depend on the nature of lignin at 30 wt. % lignin contents in the blends. The samples were etched in 1 M solution of NaOH to dissolve lignin from the cryo-fractured surface before SEM imaging. In FIG. 8A, the blend of PET and as-received lignin (L) appear as less concentrated but larger lignin droplets in PET matrix. Lignin droplet sizes vary from 1 to 2 micrometers. However, the thermally treated lignin-derived PET blend shows formation of homogenously dispersed cavities after removal of lignin macromolecules (0.2 to 2 micrometer). Controlling lignin-lignin intermolecular interaction through thermal treatment by decreasing aliphatic hydroxyl helps avoid coalescence of the lignin phase during mixing in the engineered polyester matrix.

Interfacial Interactions-Performance Relationships

Mechanical Properties.

Blending of lignin in thermoplastics often reduces tensile strength. This is primarily because the lignin forms large domains in thermoplastic matrices causing defect centers. However, lignin is known to impart rigidity and stiffness in some systems. Improving overall performance of the blends relies on the level of interactions between the lignin and the host polymer molecules. FIG. 9A illustrates the relationship between the tensile strength presented as a ratio of tensile strength of the lignin-derived composites over the tensile strength of the matrix (in this case matrix is $PET_{PL}$) ($\sigma_c/\sigma_m$) as a function of weight fraction of lignin in the blends. The ($\sigma_c/\sigma_m$) increases at low lignin loadings then diminishes with increasing lignin amount. Weak interactions between the PET and lignin generate large lignin domains in the blends (FIG. 8A) that affect performance of the blends negatively. Also, there is a possibility of thermal degradation of lignin during mixing at 240° C. leading to inferior performance. This experiment has established that the thermal pre-treatment improves lignin stability and helps to improve lignin dispersion in the PET matrix and, thus, the mechanical properties. Although thermal treatment increases the molar mass of $L_{HT}$, mechanical shear during blending helps to break the aggregates of lignin macromolecules into finer droplets compared to the system consisting of original lignin, L. Low lignin-loaded compositions show slightly improved performance of the plasticized PET matrix when combined with $L_{HT}$ compared to its control counterparts.

The compositional dependence of the mechanical properties prevents a definitive conclusion on the interactions in each blend. It has herein been observed that better interactions exist between the $L_H$ and the PET compared to L blends. Nevertheless, the results of L series imply that some level of interactions is also occurring between L and PET, possibly competing hydrogen bonding between the lignin OH and PET end groups (ester and ethylene groups) and π-π interaction between aromatic groups of lignin and PET. Overall, the representative tensile stress-strain curves of the PET and its high lignin containing blends formulated at 260° C. and 240° C. (FIGS. 9C and 9D, respectively) are in agreement that a combination of plasticization effects induced by the addition of TOFA and thermal treatment of lignin helped to enhance performance of the blends. It may also be noted that the presence of lignin in the TOFA modified PET matrix enhances ductility of the product significantly. Recycled PET-based lignin-derivatives with 30% or higher elongation at failure is surprising compared to the neat waste PET and plasticized waste PET that shows <5% and ~20% elongation, respectively. Enhanced ductility in a polyester matrix caused by presence of unfunctionalized (rather defunctionalized or devolatilized) lignin is unusual. For example, earlier results on incorporation of non-functionalized lignin in a polylactide matrix indicated reduction in the ductility of the matrix (Ouyang, Wenzhu, Yong Huang, Hongjun Luo, and Dongshan Wang. "Poly (lactic acid) blended with cellulolytic enzyme lignin: Mechanical and thermal properties and morphology evaluation." Journal of Polymers and the Environment 20, no. 1 (2012): 1-9). An earlier report on enhancing ductility of a polyester matrix by lignin incorporation required alkylation of lignin via chemical functionalization (Li, Yan, and Simo Sarkanen. "Alkylated kraft lignin-based thermoplastic blends with aliphatic polyesters." Macromolecules 35.26 (2002): 9707-9715). It may be noted here that the lignins used in this experiment were not chemically functionalized, but were subjected to thermal treatment that eliminated some chemical functionality, as evidenced earlier by the NMR data.

FIG. 9B shows the natural logarithm of reduced tensile strength as a function of volume fraction of lignin. The reduced tensile strength is described by Equation (2) below. The plot is used for quantitative estimation of interaction using the composition dependence of strength model. The model relates the interfacial interactions, structure and the mechanical properties of the blends. It is expressed to reflect the effect of volume fraction (φ) of the dispersed component, and the load bearing capacity of the dispersed lignin constituent (B), which is dependent on interfacial adhesion.

$$\sigma_{Tred} = \sigma_T \frac{1 + 2.5\varphi}{1 - \varphi} = \sigma_{T0} \exp(B\varphi) \quad (2)$$

In equation (2) above, $\sigma_{Tred}$ is the reduced tensile strength of the blend, $\sigma_T$ and $\sigma_{T0}$ are the tensile strength of the blends and the matrix, respectively.

The results are summarized in Table 4 below. The data reveals that the parameter B, which is the slope of the linear correlation applied to the data, increased from 1.82 to 2.24 when the thermally treated lignin $L_{HT}$ was used instead of L highlighting divergent interfacial adhesion. Thermal treatment was beneficial to improve thermal stability, control lignin-lignin intermolecular interactions and to control lignin-PET interaction likely through a combination of hydrogen bonding and n electron interactions that is clearly different in the composites based on as-received lignin (L). Calculated tensile stress of the matrix ($\sigma T_0$) for both cases (L and $L_{HT}$ series) agrees well with the measured value.

TABLE 4

Quantitative estimation of interactions computed from mechanical properties of the blends.

| Lignin | Treatment | $\sigma_{T0}$ (MPa) Measured | Calculated[b] | B | $R^2$ |
|---|---|---|---|---|---|
| L | As-received | 38.12 (6.31)[a] | 42.09 | 1.82 | 0.87 |
| $L_{HT}$ | Heat treated | | 42.94 | 2.24 | 0.89 |

[a] standard deviation is shown in parenthesis.
[b] Computed from the y-intercept of $\ln\sigma_{Tred}$ vs. volume fraction of lignin plots.

Dynamic Mechanical Analysis.

Loss tangent (tan δ) peaks for PET and its lignin-based alloys at 10 Hz frequency are shown in FIG. 10. Neat PET shows a narrow tan δ peak representative of its glass transition temperature $T_g$ at 101° C. and this peak shifted to lower temperature after TOFA modification. This shift is likely attributed to the presence of TOFA at 10 wt. % of PET in each blend. The tan S peaks became broader in the presence of lignin in PET matrix, and increase in lignin content increases the $T_g$. When lignin L is used, moderate interactions with PET matrix are believed to occur. The Ts is 86° C. for a 10 wt. % lignin loading in plasticized PET; use of $L_{HT}$ makes better dispersion and interactions with PET matrix, and thus, a slight increase in $T_g$ is observed (89° C.). Similar observations were made in the case of higher lignin loading (30 wt. %) in blends.

The loss tangent data represents the energy dissipated by the materials under cyclic load. Application of the Arrhenius equation to the loss factor (tan δ) peak temperature as a function of frequency data provides quantitative evaluation for the relaxation behavior of PET phase in the blends. In this instance, the Arrhenius equation can be expressed in the following form:

$$\log f = \frac{-E_a}{(2.303RT)} + \log K \quad (3)$$

where T is the absolute temperature at which the loss maximum is observed at frequency f, R is the gasconstant, K is an arbitrary constant, and $E_a$ is activation energy associated with glassy to rubber transition or relaxation. Table 5, below, shows computed $E_a$ data for neat PET (404 KJ/mol). Addition of TOFA reduced the activation energy in PET. However, the thermally treated lignin alloys have higher $E_a$ compared to the as-received lignin compositions in TOFA plasticized PET; although, the increase in $E_a$ becomes marginal at high $L_{HT}$ content in the blend. Two phenomena are apparently occurring simultaneously. First, the plasticizer is helping to depress $T_g$ while rigid lignin hinders segmental motion of PET. Treated lignin $L_{HT}$ has a higher degree of interaction with PET matrix, and thus, restrains the flexibility of the PET phase. At high $L_{HT}$ loading, however, the advantageous effect of improved dispersion on relaxation of PET matrix diminishes.

TABLE 5

Temperatures corresponding to the loss tangent peak ($T_g$) at different frequencies from the dynamic mechanical analysis, and the activation energy ($E_a$) associated with thermal relaxation at $T_g$.

| | Neat PET | | $PET_{PL}$ | | $PET_{PL}/10L$ | | $PET_{PL}/10L_{HT}$ | | $PET_{PL}/30L$ | | $PET_{PL}/30L_{HT}$ | |
|---|---|---|---|---|---|---|---|---|---|---|---|---|
| log f (Hz) | $T_g$ (°C.) | $E_a$ (KJ/mol) | $T_g$ (°C.) | $E_a$ (KJ/mol) | $T_g$ (°C.) | $E_a$ (KJ/mol) | $T_g$ (°C.) | $E_a$ (KJ/mol) | $T_g$ (°C.) | $E_a$ (KJ/mol) | $T_g$ (°C.) | $E_a$ (KJ/mol) |
| 0 | 92 | | 70 | | 71 | | 74 | | 80 | | 83 | |
| 1 | 101 | 404 | 81 | 270 | 86 | 180 | 89 | 200 | 98 | 195 | 101 | 198 |
| 2 | 104 | | 87 | | 98 | | 98 | | 104 | | 107 | |

Process Engineering and Degradation Parameters of Partially Renewable Blends

PET is a semi-crystalline polymer. Its normal processing temperatures is between 270° C. to 280° C. Blending of lignin with PET requires manipulating the PET thermal behavior to prevent degradation of lignin. The presently described approach employs a renewable plasticizer to soften PET matrix. In practice, low molecular weight plasticizers are often added to increase the flexibility at room temperature and to improve processing. All blends studied in this experiment were mixed at 240° C., a processing of PET that was made possible by the addition of plasticizer. In thermoplastic matrix-lignin systems, compatibility and dispersion of lignin are desired for enhanced mechanical properties. Often, partial or full miscibility helps improve the properties of the blends. The present results show some level of affinity between the L lignin and PET. However, such interactions are improved when Lm is used. Miscibility could have been increased by raising the melt-mixing temperature, but that approach would degrade the lignin, cause charring of lignin, and subsequent phase separation during shear mixing. Viscous heating is another cause of lignin degradation during melt-mixing. Viscous heating is another cause of lignin degradation during melt-mixing. Thus, rheological behaviors of the components and the blends are important. Ultimately, the process depends on the molecular structures of the components. Therefore, differences in lignin molecular structure are expected to affect rheological behaviors of the resulting polymer blends.

Figure 11A:
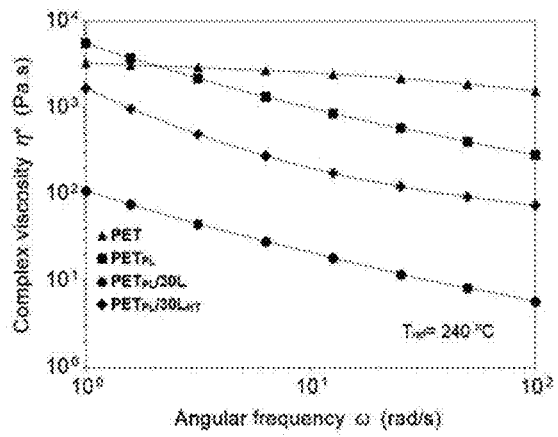
Figure 11B:
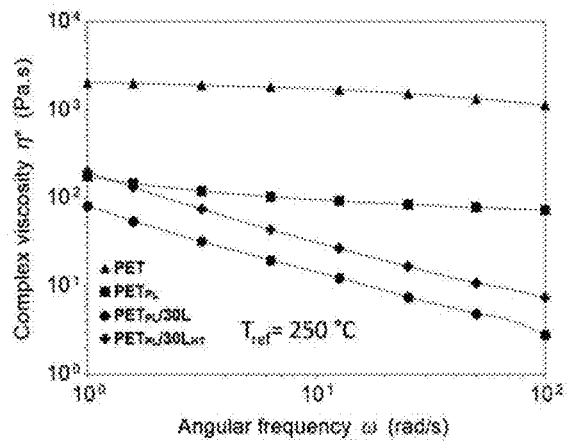
Figure 11C:
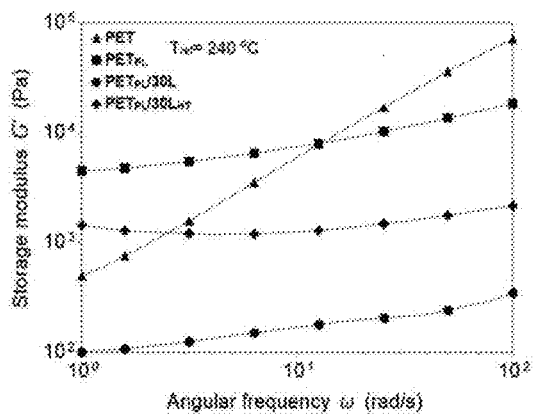
Figure 11D:
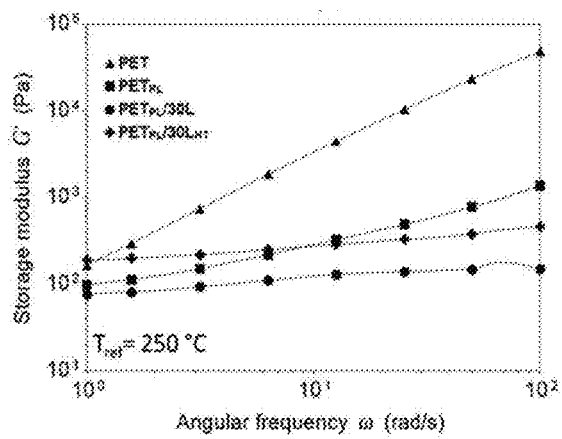

The influence of lignin molar structure on flow characteristics of the PET blends is illustrated in FIGS. 11A-11D. The angular frequency (ω) dependence of the complex viscosity (η*) and the storage modulus (G') were used to study flow characteristics of neat PET, its plasticized blend at 10 wt. % plasticizer amount ($PET_{PL}$), and its lignin derived blends at high-lignin-loading (30 wt. %) at reference temperatures of 240° C. and 250° C. Plasticization outcome is clear as the viscosity decreased at both temperatures with increasing frequency. The material stiffness at 240° C. is higher compared to its stiffness at 250° C. (FIGS. 11C and 11D). Addition of lignin further decreases the viscosity and the storage modulus at both reference temperatures, suggesting a role of viscous oligomeric lignin on plasticization of the PET melt. Interestingly, the blend with thermally treated lignin ($PET_{PL}/30L_{HT}$) has higher viscosity and storage modulus than the as-received lignin blend ($PET_{PL}/30L$). As discussed earlier, this is due to the homogenous dispersion of $L_{HT}$ in PET (as shown by microscopy), and possible enhanced interfacial interactions through combination of hydrogen bonding and π-π interaction of lignin with PET chains and restrained chain disentanglement along with retardation of segmental relaxation (in accordance to DMA data around the glass transition temperature $T_g$ of the blends).

Thermogravimetric analysis was used to evaluate thermal degradation behavior of the blends in oxidative atmosphere. Mass loss data collected at 20° C./min scanning rate were also determined and the results are summarized in Table 6 below. Addition of lignin reduces the temperature corresponding to 5% mass loss ($T_i$) and the onset temperature ($T_d$) but increases the derivative weight peak temperature. Addition of lignin improves net degradation of the blends and confirms the effect of thermal treatment of lignin on the thermal stability of the blends. $L_{HT}$ blend is marginally more stable at higher temperatures than the L blend. Additionally, mass at 500° C. increased with the addition of lignin showing the protective effect of lignin at higher temperatures.

TABLE 6

Thermal degradation parameters of neat PET, $PET_{PL}/30L$ and $PET_{PL}/L_{HT}$.

| | PET | $PET_{PL}/30L$ | $PET_{PL}/30L_{HT}$ |
|---|---|---|---|
| 5% weight loss Temp. $T_i$ (° C.) | 391 | 290 | 303 |
| Onset temperature Td (° C.) | 400 | 388 | 390 |
| DTG peak temperature (° C.) | 436 | 438 | 440 |
| Mass at 300° C. (%) | 99.9 | 93.9 | 95.3 |
| Mass at 500° C. (%) | 14.3 | 27.1 | 27.6 |

While there have been shown and described what are at present considered the preferred embodiments of the invention, those skilled in the art may make various changes and modifications which remain within the scope of the invention defined by the appended claims.

What is claimed is:

1. A plasticized terephthalate-based polyester blend comprising a terephthalate-based polyester homogeneously blended with a fatty acid or ester thereof, wherein said fatty acid or ester thereof is present in said polyester blend in an amount of 10-50 wt %; and wherein the terephthalate-based polyester has the formula:

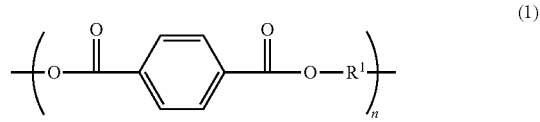

(1)

wherein $R^1$ is a hydrocarbon linker containing 1-12 carbon atoms, and n is at least 50.

2. The polyester blend of claim 1, wherein said fatty acid contains at least eight carbon atoms.

3. The polyester blend of claim 1, wherein said fatty acid contains at least ten carbon atoms.

4. The polyester blend of claim 1, wherein said fatty acid contains at least twelve carbon atoms.

5. The polyester blend of claim 1, wherein said fatty acid is tall oil fatty acid.

6. The polyester blend of claim 1, wherein said terephthalate-based polyester is polyethylene terephthalate.

7. The polyester blend of claim 1, wherein said fatty acid or ester thereof is present in said polyester blend in an amount of 10-30 wt %.

8. The polyester blend of claim 1, further comprising lignin in an amount of 1-50 wt % by weight of said polyester blend, wherein said lignin is homogeneously blended in said polyester blend.

9. The polyester blend of claim 8, wherein said lignin has a molecular weight of 500-5000 g/mole.

10. The polyester blend of claim 8, wherein said lignin is present in said polyester blend in an amount of 5-50 wt %.

11. The polyester blend of claim 8, wherein said lignin is present in said polyester blend in an amount of 1-40 wt %.

12. The polyester blend of claim 8, wherein said lignin is present in said polyester blend in an amount of 5-40 wt %.

13. A method for producing a plasticized terephthalate-based polyester blend, the method comprising melt mixing a terephthalate-based polyester with a fatty acid or ester thereof at a temperature in a range of 230-250° C. to produce said polyester blend, wherein said fatty acid or ester thereof is present in said polyester blend in an amount of 10-50 wt % and is homogeneously blended with said terephthalate-based polyester; and wherein the terephthalate-based polyester has the formula:

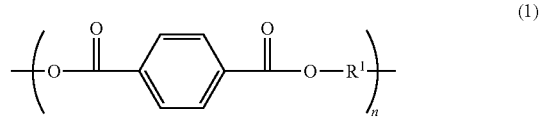

(1)

wherein $R^1$ is a hydrocarbon linker containing 1-12 carbon atoms, and n is at least 50.

14. The method of claim 13, wherein said fatty acid contains at least eight carbon atoms.

15. The method of claim 13, wherein said fatty acid contains at least ten carbon atoms.

16. The method of claim 13, wherein said fatty acid contains at least twelve carbon atoms.

17. The method of claim 13, wherein said fatty acid is tall oil fatty acid.

18. The method of claim 13, wherein said terephthalate-based polyester is polyethylene terephthalate.

19. The method of claim 13, wherein said fatty acid or ester thereof is present in said polyester blend in an amount of 10-30 wt %.

20. The method of claim 13, further comprising melt mixing lignin with said terephthalate-based polyester and fatty acid or ester thereof, wherein said lignin is included in an amount of 1-50 wt % by weight of said polyester blend, and wherein said lignin is homogeneously blended in said polyester blend.

21. The method of claim 20, wherein said lignin has a molecular weight of 500-5000 g/mole.

22. The method of claim 20, wherein said lignin is present in said polyester blend in an amount of 5-50 wt %.

23. The method of claim 20, wherein said lignin is present in said polyester blend in an amount of 1-40 wt %.

24. The method of claim 20, wherein said lignin is present in said polyester blend in an amount of 5-40 wt %.

25. The method of claim 20, wherein one or more solid ingredients in said terephthalate-based polyester are thermally treated under at least partial vacuum at a temperature within a range of 150-250° C. before being melt-mixed to produce the polyester blend.

26. The method of claim 20, wherein said lignin is heat treated lignin.

27. The polyester blend of claim 1, wherein n is 50-1000.

* * * * *